United States Patent

[11] 3,614,736

[72] Inventors John A. McLaughlin
San Jose, Calif.;
Josef Raviv, Ossining, N.Y.

[21] Appl. No. 730,828
[22] Filed May 21, 1968
[45] Patented Oct. 19, 1971
[73] Assignee International Business Machines Corporation
Armonk, N.Y.

[54] PATTERN RECOGNITION APPARATUS AND METHODS INVARIANT TO TRANSLATION, SCALE CHANGE AND ROTATION
8 Claims, 27 Drawing Figs.

[52] U.S. Cl. 340/146.3Q, 235/181
[51] Int. Cl. G06k 9/08
[50] Field of Search 340/146.3; 235/181

[56] References Cited

UNITED STATES PATENTS

| | | | |
|---|---|---|---|
| 3,104,369 | 9/1963 | Rabinow et al. | 340/146.3 |
| 3,104,371 | 9/1963 | Holt | 340/146.3 |
| 3,196,394 | 7/1965 | Horwitz et al. | 340/146.3 |
| 3,196,397 | 7/1965 | Goldstine et al. | 340/146.3 |
| 3,278,899 | 10/1966 | Shelton, Jr. et al. | 340/146.3 |
| 3,492,646 | 1/1970 | Bene et al. | 340/146.3 |
| 3,292,148 | 12/1966 | Giuliano et al. | 340/146.3 |
| 3,435,244 | 3/1969 | Burckhardt et al. | 340/146.3 X |

*Primary Examiner*—Maynard R. Wilbur
*Assistant Examiner*—Leo H. Boudreau
*Attorneys*—Hanifin and Clark and Graham S. Jones, II

ABSTRACT: A pattern recognition system is disclosed which will recognize patterns irrespective of their translation rotation or scale change. Input data may be provided by a scanner or other suitable data source. Means for calculating the center of gravity, or alternatively the autocorrelation function are provided which can be employed; and then the data can be transformed for an actual or simulated annular or equivalently radial scan, with exponential spacing along radii. Alternatively, a straightforward raster scan may be employed for recognition which is invarient to translation only. The output is then processed in means for cross correlating with known patterns. The result is preferably raised to the Nth power and summed. Alternatively, 2 can be raised to the power of the cross correlation times K and summed which is easily done on a digital computer, or finally the result can be subjected to maximum operation. In all cases, the pattern is then processed through corresponding means for normalization including a storage device, a multiplier and a decision function unit. Prior to operation for pattern recognition, the system is operated with the normalization storage connected through an inverter to the output of one of the Nth power, power of 2 or maximum operation units for receiving the appropriately processed data relative to a sample for normalization. Then the appropriate normalization may be supplied for each mode of processing after cross correlation.

INVENTORS
JOHN A. McLAUGHLIN
JOSEF RAVIV

BY Graham S. Jones, II
ATTORNEY

LOGIC BOX I

FIG. 9 LOGIC BOX II
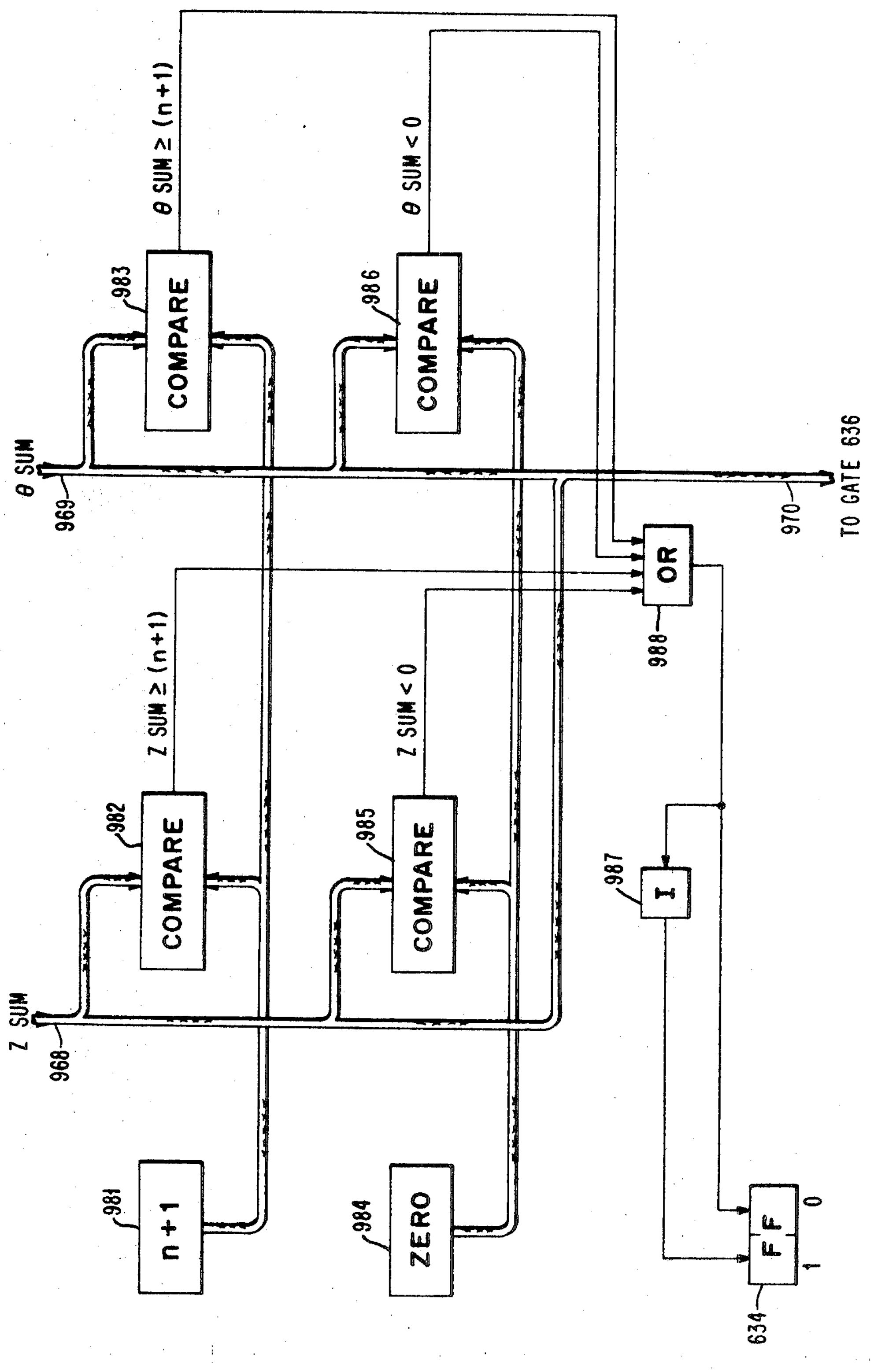

PATTERN RECOGNITION APPARATUS AND METHODS INVARIANT TO TRANSLATION, SCALE CHANGE AND ROTATION

BACKGROUND OF THE INVENTION

1. Field of Invention

This invention relates to pattern recognition and more particularly to means for pattern recognition employing cross correlation.

2. Description of the Prior Art

Pertinent prior art of which we are presently aware is as follows:

a. Optical and Electro-Optical Information Processing, edited by Tippet et al., Chapter 34, MIT. Press, 1965, pages 615–637.
b. U.S. Pat. No. 3,196,397 of Goldstine et al. dated July 20, 1965, and commonly assigned.
c. Copending application Ser. No. 682,351 filed July 13, 1967 in behalf of Chao K. Chow, and commonly assigned (Y09–67–B094).
d. W. Doyle, Operations Useful for Similarity-Invariant Pattern Recognition, Journal Association for Computing Machinery Vol. 9, No. 2, Apr. 1962, pages 259–267.
e. U.S. Pat. No. 2,838,602 of Sprick dated June 10, 1958 and commonly assigned.
f. U.S. Pat. No. 3,050,711 of Harmon dated Aug. 21, 1962.
g. U.S. Pat. No. 2,968,789 of Weiss et al. dated Jan. 17, 1961.

SUMMARY OF THE INVENTION

In accordance with this invention, it is desired to provide efficient means for recognizing patterns in comparison with references.

In most pattern recognition problems, each pattern can be described as a scalar function of time or spatial coordinates. In many cases, a translation or scale change or rotation has no effect on class membership. For example, the symbol 5 belongs to the class of fives regardless of position or size. In such cases, position and scale are nuisance parameters that one would like to remove before evaluating decision functions. A common approach, followed is to apply transformations which would eliminate these parameters. Regarding each pattern as a point in a vector space, we wish to map all points corresponding to translated (or scaled) versions of one pattern into a single point. In addition, patterns which differ in other ways should map into distinct points, and in some sense, patterns which are similar should map into points that are close together. In what follows, to simplify notation, we shall restrict ourselves to functions of one coordinate, but essentially all of the results extend in an obvious way to functions of vectors.

Translation Invariance

Given a real-valued function $f(m)$, its Nth order autocorrelation function is defined by $$D_f^{(n)}(m^{(1)}, \ldots, m^{(n)}) = \int_{-\infty}^{\infty} f(m)\, f(m+m^{(1)}), \ldots, f(m+m^{(n)})\, dm \quad (1)$$

It is easy to see that this function is translation invariant in the sense that $f_1(m)$ and $f_2(m)=f_1(m+\tau)$ have the same Nth order autocorrelation function, where $\tau$ represents translation of $f_1(m)$.

The use of these functions in pattern recognition was suggested by H. H. Goldstine et al. in U.S. Pat. No. 3,196,397, issued July 30, 1965 to the assignee hereof, at Col. 8, line 25. In particular, they suggested the use of the discrete variable version (integrals replaced by numbers) of the following similarity measure.

$$S_{S,R_a} = \frac{\int_{-\infty}^{\infty} \cdots \int_{-\infty}^{\infty} D_S^{(n)}(m^{(1)}, \ldots, m^{(n)}) D_{R_a}^{(n)}(m^{(1)}, \ldots, m^{(n)})\, dm^{(1)} \ldots dm^{(n)}}{\left\{\int_{-\infty}^{\infty} \cdots \int_{-\infty}^{\infty} D_{R_a}^{(n)}(m^{(1)}, \ldots, m^{(n)}) D_{R_a}^{(n)}(m^{(1)}, \ldots, m^{(n)})\, dm^{(1)} \ldots dm^{(n)}\right\}^{1/2}} \quad (2)$$

where $S$ is the pattern or specimen to be classified and $R_a$ is one of the references. In order to calculate $S_S,R_a$ in this form one would first have to obtain $D_S^{(n)}$ and $D_{R_a}^{(n)}$. If we consider the discrete version of $D^{(n)}$ and if we suppose that each $m^{(i)}$ ranges over X values (500 for example) even for small values of $n$ (3 for example) to store $D_S^{(n)}$ alone would require an $X^n$ ($500^3$) capacity memory. We have discovered that $S_S,R_a$ can be computed from S and $R_a$ without ever calculating their Nth order autocorrelation functions as follows:

$$S_{S,R_a} = \frac{\int_{-\infty}^{\infty}\left[\int_{-\infty}^{\infty} S(m)R_a(m+\tau)\,dm\right]^{n+1} d\tau}{\left\{\int_{-\infty}^{\infty}\left[\int_{-\infty}^{\infty} R_a(m)R_a(m+\tau)\,dm\right]^{n+1} d\tau\right\}^{1/2}} \quad (3)$$

In an implementation a discrete version of the similarity measure will be used.

$$S_{S,R_a^{(D)}} = \frac{\sum_\tau\left[\sum_m S(m)R_a(m+\tau)\right]^{n+1}}{\left\{\sum_\tau\left[\sum_m R_a(m)R_a(m+\tau)\right]^{n+1}\right\}^{1/2}} \quad (4)$$

This requires a memory of the same order of size as the one required for storing S and $R_a$ only (500 points each for example).

It can be shown that for a very broad class of functions $f_1(m)$ and $f_2(m)$ can have the same second order autocorrelation function only if $f_1(m)=f_2(m+\tau)$ for all $m$ and some $\tau$. Thus decision functions applied to second order autocorrelation functions give a composite function which essentially includes all translation invariant decision functions.

Scale Change Invariance

Given a real-valued function $f(W)$ let us define its Nth order self scale function $F_f^{(n)}$ by $$F_f^{(n)}(K_1, \ldots, K_n) = \int_\epsilon^\infty f(W) f(WK_1) \ldots f(WK_n) \frac{1}{W}\, dW \qquad \epsilon < 0 \quad (5)$$

It is converted to the discrete version in the obvious way with integrals replaced by numbers.

It is easy to see that this function is invariant to scale change in the sense the $f_1(W)$ and $f_2(W)$ and $f_2(W)=f_1(WK)$ have the same Nth order self-scale function. It can be shown that for a very broad class of functions $f_1(W)$ and $f_2(W)$ can have the same second order self-scale function only if $f_1(W)=f_2(WK)$ for all W and some K. Thus decision functions applied to second order self-scale functions give a composite function which essentially includes all scale change invariant decision functions. Let us define the following similarity measure $$L_{S,R_a} = \frac{\int_\epsilon^\infty \cdots \int_\epsilon^\infty F_S^{(n)}(K_1, \ldots, K_n) F_{R_a}^{(n)}(K_1, \ldots, K_n) \frac{1}{K_1} \cdots \frac{1}{K_n} dK_1 \ldots dK_n}{\left\{\int_\epsilon^\infty \cdots \int_\epsilon^\infty F_{R_a}^{(n)}(K_1, \ldots, K_n) F_{R_a}^{(n)}(K_1, \ldots, K_n) \frac{1}{K_1} \cdots \frac{1}{K_n} dK_1 \ldots dK_n\right\}^{1/2}} \quad \epsilon > 0 \quad (6)$$

We have discovered that $L_{S,Ra}$ can be calculated from S and $R_a$ without ever calculating $F_S^{(n)}$ and $F_{R_a}^{(n)}$ as follows:

$$L_{S,R_a}=\frac{\int_\epsilon^\infty\left[\int_\epsilon^\infty S(W)R_a(WK)\frac{1}{W}dW\right]^{n+1}\frac{1}{K}dK}{\left\{\int_\epsilon^\infty\left[\int_\epsilon^\infty R_a(W)R_a(WK)\frac{1}{W}dW\right]\frac{1}{K}dK\right\}^{1/2}}\quad \epsilon>0 \qquad (7)$$

In an implementation a discrete version of the similarity measure will be used:

$$L_{S,R_a}^{(D)}=\frac{\sum_K\left[\sum_W S(W(R_a(WK)\frac{1}{W}\right]^{n+1}\frac{1}{K}}{\left\{\sum_K\left[\sum_W R_a(W)R_a(WK)\frac{1}{W}\right]^{n+1}\frac{1}{K}\right\}^{1/2}} \qquad (8)$$

The function in the square brackets in the numerator of Equation (7) is defined as the cross scale function. Workers in the fields of pattern recognition communication theory and related fields have spent many years in developing efficient cross-correlators. We shall show that $L_{S,R_a}$ can be obtained by taking the $n+1$ power of the cross correlation of modified functions $S^{(1)}(Z)$ and $R_a^{(1)}(Z)$ and the autocorrelation of $R_a^{(1)}(Z)$.

If we let $S^{(1)}(Z)=S(de^c(Z^+b))$, where $d$, $b$, and $c$ are constants and $R_a^{(1)}(Z)=R_a(de^{c(Z+b)})$ finally $K_1=\ln K/c$ we obtain from (7):

$$L_{S,R_a}=C_1\frac{\int_{-\infty^+}^\infty\left[\int_{+\infty^+}^\infty S^{(1)}(Z)R_a^{(1)}(Z+K_1)dZ\right]^{n+1}dK_1}{\left\{\int_{-\infty^+}^\infty\left[\int_{-8^+}^\infty R_a^{(1)}(Z)R_a^{(1)}(Z+K_1)dZ\right]^{n+1}dK_1\right\}^{1/2}}. \qquad (9)$$

where $C_1$ is a constant. In an implementation a discrete version will be used:

$$L_{S,R_a}^{(D)}=C_1\frac{\sum_{K_1}\left[\sum_Z S^{(1)}(Z)R_a^{(1)}(Z+K_1)\right]^{n+1}}{\left\{\sum_{K_1}\left[\sum_Z R_a^{(1)}(Z)R^{(1)}(Z+K_1)\right]^{n+1}\right\}^{1/2}} \qquad (10)$$

Invariance to Scale and Rotation

Given a real-valued function in polar coordinates (around an appropriately chosen center) $f(r,\theta)$ let us define an $N^{th}$ order hybrid self-function by $$G_f^{(n)}(K_1,\ldots,K_n,\theta^{(1)},\ldots,\theta^{(n)})=\int_0^{2\pi}\int_\epsilon^\infty f(r,\theta)f(rK_1,\theta+\theta^{(1)})\ldots f(rK_n,\theta+\theta^{(n)})\frac{1}{r}drd\theta \qquad (11)$$

It is easy to see that this function is invariant to a scale change in the first coordinate $r$ and translation in the second coordinate $\theta$ (i.e. to size and rotation for the polar coordinate case). It can be shown that for a very broad class of functions $f_1(r,\theta)$ and $f_2(r,\theta)$ can have the same second order hybrid self function only if $f_1(r,\theta)=f_2(rl,\theta+\theta^{(1)})$ for all $r$ and $\theta$ and some K and $\theta^{(1)}$. Thus decision functions applied to second order hybrid self functions give a composite function which essentially includes all scale and rotation (a more general scale in one coordinate and translation in the other) invariant decision functions.

Let us define the following similarity measure $$H_{S,R_a}=\frac{\int_\epsilon^\infty\ldots\int_\epsilon^\infty\int_0^{2\pi}\ldots\int_0^{2\pi}G_s^{(n)}(K_1,\ldots,K_n,\theta^{(1)},\ldots,\theta^{(n)})G_{R_a}(K_1,\ldots,K_n,\theta^{(1)},\ldots,\theta^{(n)})\frac{1}{K_1}\ldots\frac{1}{K_n}dK_1\ldots dK_nd\theta^{(1)}\ldots d\theta^{(n)}}{\left\{\int_\epsilon^\infty\ldots\int_\epsilon^\infty\int_0^{2\pi}\ldots\int_0^{2\pi}G^{(n)}(K_1,\ldots,K_n,\theta^{(1)},\ldots,\theta^{(n)})G_{R_a}^{(n)}(K_1,\ldots,K_n,\theta^{(1)},\ldots,\theta^{(n)})\frac{1}{K_1}\ldots\frac{1}{K_n}dK_1\ldots dKnd\theta^{(1)}\ldots d\theta^{(n)}\right\}^{1/2}}\quad\epsilon>0 \qquad (12)$$

It can be shown that $H_{S,R_a}$ can be calculated from S and $R_a$ without ever calculating $G_S^{(n)}$ and $G_{R_a}^{(n)}$ as follows:

$$H_{S,R_a}=\frac{\int_\epsilon^\infty\int_0^{2\pi}\left[\int_\epsilon^\infty\int_0^{2\pi}S(r,\theta)R_a(rK,\theta+\theta^{(1)}\frac{1}{r}drd\theta\right]^{n+1}\frac{1}{K}dKd\theta^{(1)}}{\left\{\int_\epsilon^\infty\int_0^{2\pi}\left[\int_\epsilon^\infty\int_0^{2\pi}R_a(r,\theta)R_arK,\theta+\theta^{(1)})\frac{1}{r}drd\theta\right]^{n+1}\frac{1}{K}dKd\theta^{(1)}\right\}^{1/2}}\quad\epsilon>0 \qquad (13)$$

The function in the square brackets in the numerator of Equation (13) is defined as the hybrid cross function.

In an implementation a discrete version of the similarity measure will be used $$H_{S,R_a}^D=\frac{\sum_K\sum_{\theta^{(1)}}\left[\sum_r\sum_\theta S(r,\theta)R_a(rK,\theta+\theta^{(1)})\frac{1}{r}\right]^{n+1}\frac{1}{K}}{\left\{\sum_K\sum_{\theta^{(1)}}\left[\sum_r\sum_\theta R_a(r,\theta)R_a(rK,\theta+\theta^{(1)})\frac{1}{r}\right]^{n+1}\frac{1}{K}\right.} \qquad (14)$$

If we let $S^{(2)}(Z,\theta)=S(de^{c(Z+b)},\theta)$, $R_a^{(2)}(Z,\theta)=R_a^{(2)}(de^{c(Z+b)},\theta)$ and $K_1=\ln K/c$ then $H_{S,R_a}$ can be expressed as $$H_{S,R_a}^D=C_1\frac{\int_{-\infty^+}^\infty\int_0^{2\pi}\left[\int_{-\infty^+}^\infty\int_0^{2\pi}S^{(2)}(Z,\theta)R_a^{(2)}(Z+K_1,\theta+\theta^{(1)})dZd\theta\right]^{n+1}dK_1d\theta^{(1)}}{\left\{\int_{-\infty^+}^\infty\int_0^{2\pi}\left[\int_{-\infty^+}^\infty\int_0^{2\pi}R_a^{(2)}(Z,\theta)R_a^{(2)}(Z+K_1,\theta+\theta^{(1)})dZd\theta\right]^{n+1}dK_1d\theta^{(1)}\right\}^{1/2}} \qquad (15)$$

Where $c_1$ is a constant. In an implementation a discrete version will be used $$H_{S,R_a}^D=C_1\frac{\sum_{K_1}\sum_{\theta^{(1)}}\left[\sum_Z\sum_\theta S^{(2)}(Z,\theta)R_a^{(2)}(Z+K_1,\theta+\theta^{(1)})\right]^{n+1}}{\left\{\sum_{K1}\sum_\theta\left[\sum_Z\sum_\theta R_a^{(2)}(Z,\theta)R_a^{(2)}(Z+K_1,\theta+\theta^{(1)})\right]^{n+1}\right\}^{1/2}} \qquad (16)$$

Let us now define the following similarity measures.

$$M^{(1)}_{S,R_a}=\frac{\sum_{K}\frac{1}{K}2^{b\left[\sum_{W}S(W)R_a(WK)\frac{1}{W}\right]}}{\left\{\sum_{K_1}\frac{1}{K}2^{b\left[\sum_{W}R_a(W)R_a(WK)\frac{1}{W}\right]}\right\}^{1/2}} \quad (17)$$

$M^{(1)}_{S,R_a}$ can also be calculated from $$M^{(1)}_{S,R_a}=C_2\frac{\sum_{K_1}2^{b\left[\sum_{Z}S^{(1)}(Z)R^{(1)}_a(Z+K_1)\right]}}{\left\{\sum_{K_1}2^{b\left[\sum_{Z}R^{(1)}_a(Z)R^{(1)}_a(Z+K_1)\right]}\right\}^{1/2}} \quad (18)$$

where $b$ and $c_2$ are constants and $s^{(1)}$, $R_a^{(1)}$ and $K_1$ are previously defined.

$$M^{(2)}_{S,R_a}=\frac{\sum_{K}\sum_{\theta^{(1)}}\frac{1}{K}\left[2^{b\left[\sum_{r}\sum_{\theta}S(r,\theta)R_a(rK,\theta+\theta^{(1)})\frac{1}{r}\right]}\right]}{\left\{\sum_{K}\sum_{\theta^{(1)}}\frac{1}{K}\left[2^{b\left[\sum_{r}\sum_{\theta}R_a(r,\theta)R_a(rK,\theta+\theta^{(1)})\frac{1}{K}\right]}\right]\right\}^{1/2}} \quad (19)$$

$M^{(2)}_{S,R_a}$ can also be calculated from $$M^{(2)}_{S,R_a}=C_2\frac{\sum_{K_1}\sum_{\theta^{(1)}}\left[2^{b\left[\sum_{Z}\sum_{\theta}S^{(2)}(Z,\theta)R^{(2)}_a(Z+K_1,\theta+\theta^{(1)})\right]}\right]}{\left\{\sum_{K_1}\sum_{\theta^{(1)}}\left[2^{b\left[\sum_{Z}\sum_{\theta}R^{(2)}_a(Z,\theta)R^{(2)}_a(Z+K_1,\theta+\theta^{(1)})\right]}\right]\right\}^{1/2}} \quad (20)$$

$S^{(2)}$, $R_a^{(2)}$ and $K_1$ are previously defined.

Let us further define $$B^{(1)}_{S,R_a}=\frac{\max_{K}\left[\sum_{W}S(W)R_a(WK)\frac{1}{W}\right]}{\left\{\sum_{W}R^2_a(W)\frac{1}{W}\right\}^{-1/2}} \quad (21)$$

$B^{(1)}_{S,R_a}$ can also be calculated from $$B^{(1)}_{S,R_a}=C_3\frac{\max_{K1}\left[\sum_{Z}S^{(1)}(Z)R^{(1)}_a(Z+K_1)\right]}{\left\{\sum_{Z}R^{(1)}_a(Z)R^{(1)}_a\right\}^{1/2}} \quad (22)$$

where $C_3$ is a constant.

We also define $$B^{(2)}_{S,R_a}=\frac{\max_{K,\theta^{(1)}}\left[\sum_{w}\sum_{\theta}S(W,\theta)R_a(WK,\theta+\theta^{(1)})\frac{1}{W}\right]}{\left\{\sum_{W}\sum_{\theta}R_a(W,\theta)R_a(W,\theta)\right\}^{1/2}} \quad (23)$$

$B^{(2)}_{S,R_a}$ can also be calculated from $$B^{(2)}_{S,R_a}=C_3\frac{\max_{K1,\theta^{(1)}}\left[\sum_{Z}\sum_{\theta}S^{(2)}(Z,\theta)R^{(2)}_a(Z+K_1,\theta+\theta^{(1)})\right]}{\left\{\sum_{K_1}\sum_{\theta^{(1)}}R^{(2)}(Z,\theta)R^{(2)}(Z,\theta)\right\}^{1/2}} \quad (24)$$

An object of this invention is to provide pattern recognition by means of a comparison employing an effective Nth order self-series integral or function.

An object of this invention is to provide pattern recognition by means of a comparison employing an effective Nth order hybrid self-integral or function.

Another object of this invention is to provide pattern recognition by means of an effective cross-series integral.

An object is to provide improved normalization.

Another object of this invention is to provide a recognition system which will recognize patterns irrespective of their size, scale, and rotation.

The foregoing and other objects, features and advantages of the invention will be apparent from the following more particular description of preferred embodiments of the invention, as illustrated in the accompanying drawings.

Figures 4, 4A:
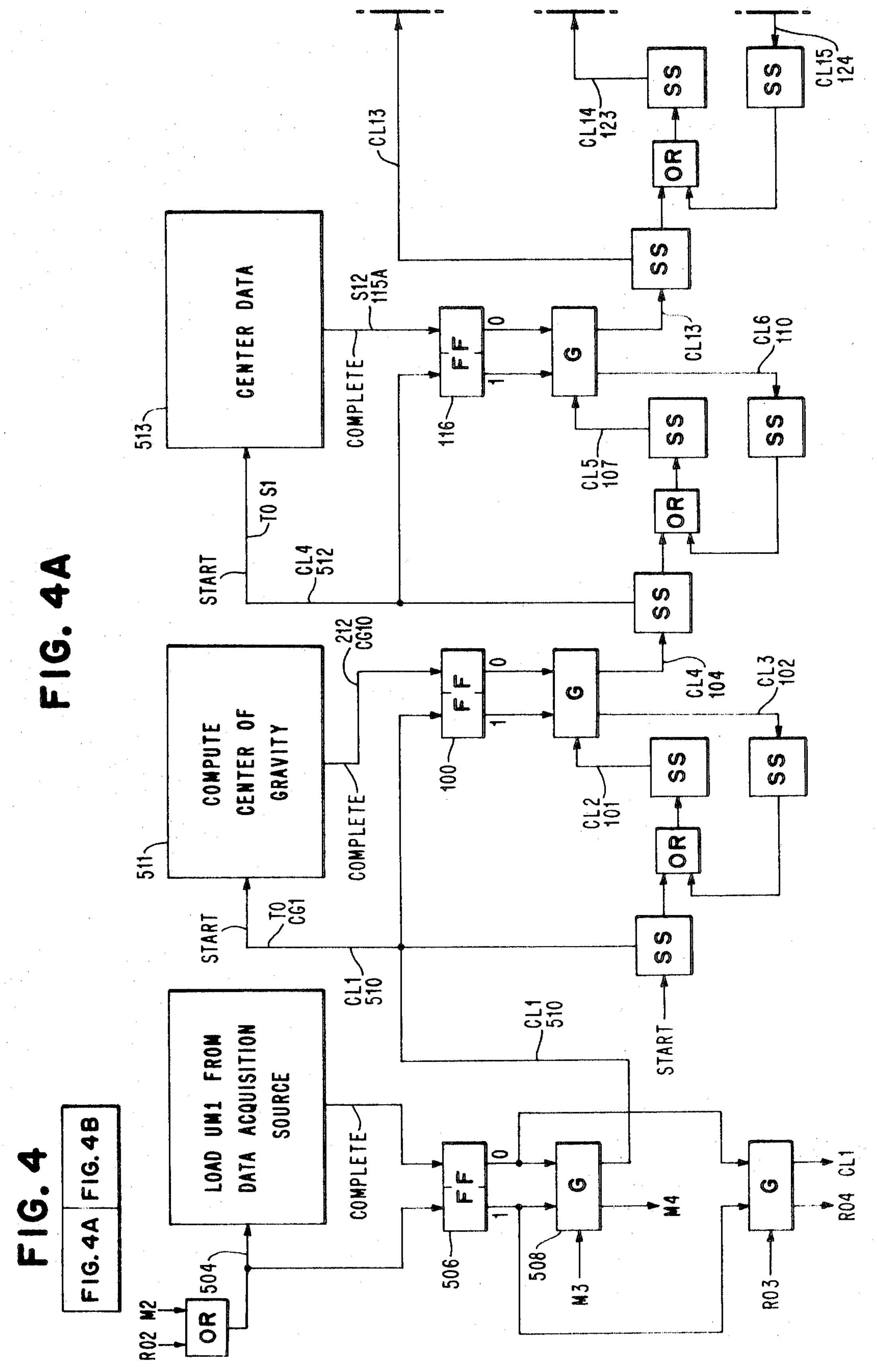
Figure 4B:
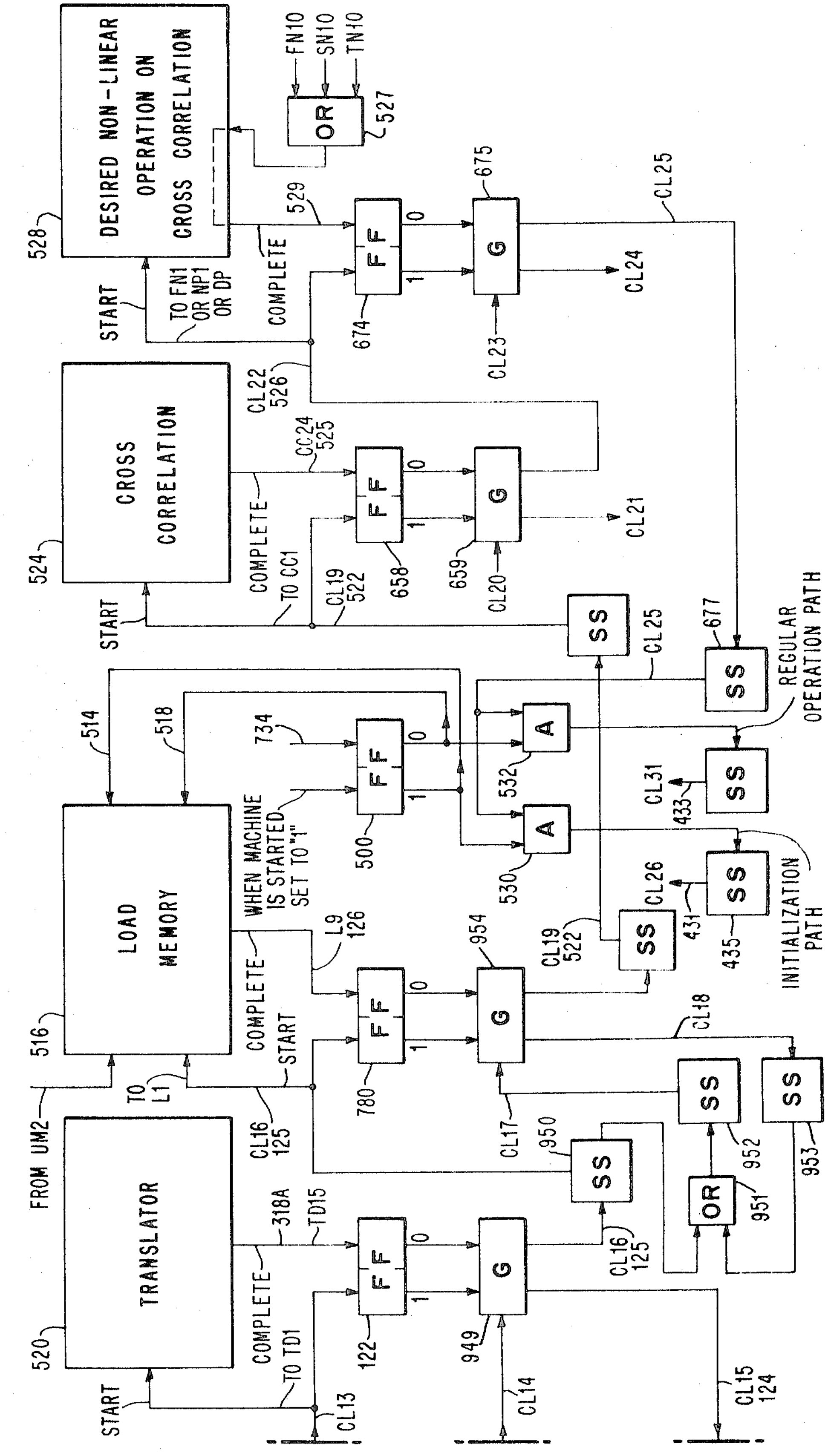

FIGS. 4, 4A and 4B constitute a flow diagram indicating the program sequence and the timing relationships between microprograms.

FIGS. 5, 5A–5D constitute a flow diagram showing the operation of computing the center of gravity, center data, and translator microprograms.

FIGS. 6, 6A–6F show the flow charts for a plurality of subsequent microprograms including cross correlation, and nonlinear operations.

FIGS. 7, 7A–7C show the flow charts for the loading of a secondary memory from the translator.

Figure 8:
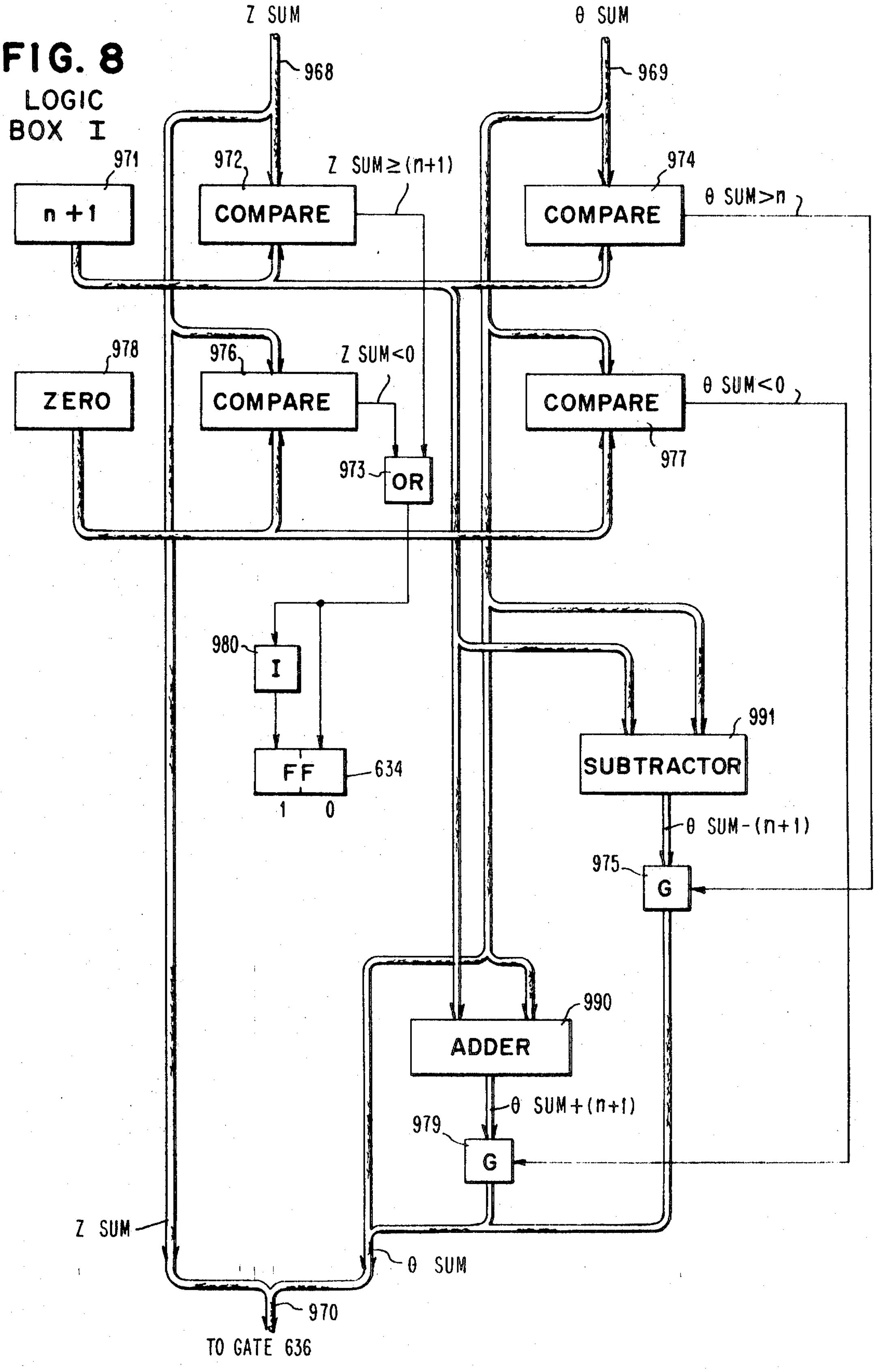

FIG. 8 shows one logic unit for generating a true address.

FIG. 9 shows a second logic unit for generating a true logic address.

Figure 1:
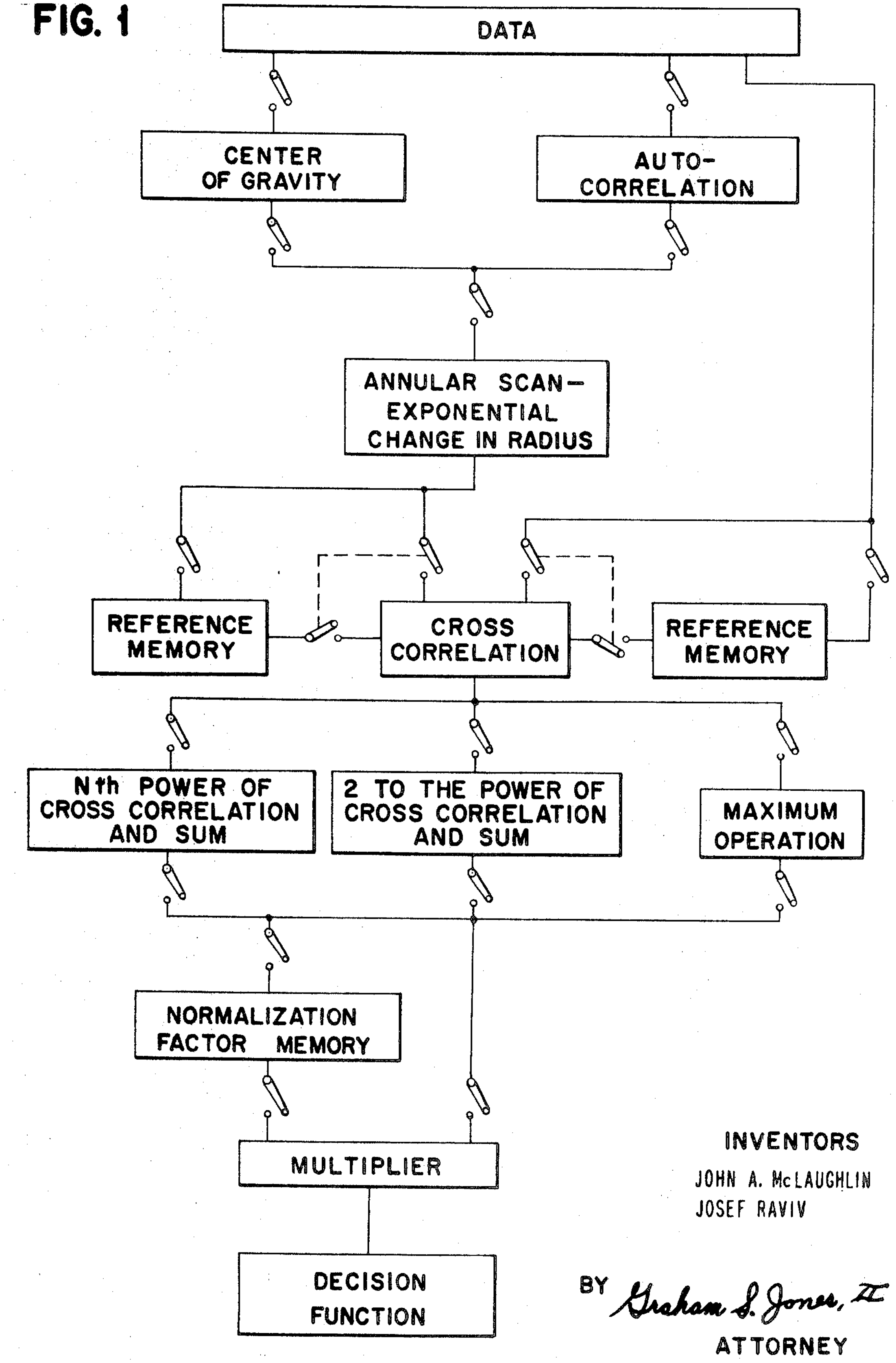
FIG. 1 is an overall systems flow chart of the invention.

FIG. 1 shows the overall system flow chart. Originally data which may be provided by means of raster scan is collected into a data memory. Therefrom it may be passed by three separate routes either directly into the cross correlation unit and the associated reference memory; or it may be passed through a center of gravity calculation or through an autocorrelation calculation. The center of gravity calculation is preferable. In any event, the output of the center of gravity or autocorrelation calculation is passed through means for providing a translation into an annular scan with an exponential change in radius. From there, the data is passed into the cross correlation unit and a plurality of reference memories are cross correlated with the input signal information which has been secured for cross correlation. Subsequently, any one of four possible nonlinear operations may be performed on the output of the cross correlation unit. One of those nonlinear functions is to raise the output of the cross correlation function to the Nth power and sum. A second nonlinear operation is to raise 2 to the power of the cross correlation output and sum. The third nonlinear operation is to employ a maximum operation which selects the largest one of the cross correlation outputs. The output of the nonlinear operation is normalized by a normalization memory and a multiplier. A normalization factor memory is supplied with data during the time when the reference memories are being supplied with reference information and it includes means for providing the reciprocal of the output of the nonlinear operation for the purpose of providing normalization of the output from the nonlinear function. Then, the output of the nonlinear operation and the normalization factor memory are multiplied so that the normalized nonlinear function of the cross correlation may be passed on into a unit which will provide a decision function in accordance with many well-known decision functions which may be employed for pattern recognition.

Example

Figure 2A:
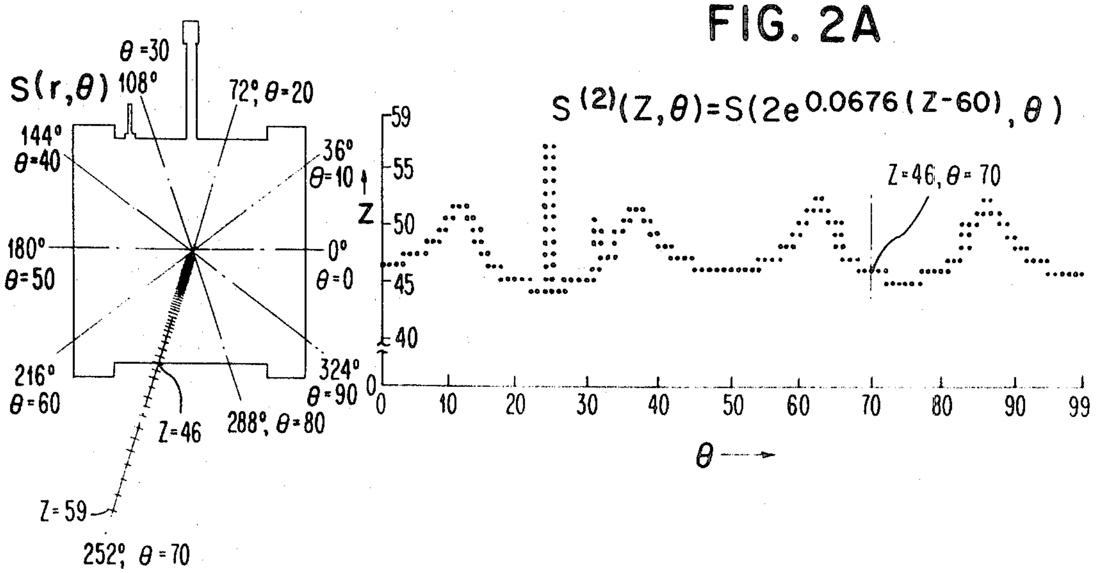
FIGS. 2A–2C are graphic and pictorial representations of three tanks as viewed from an annular scan with exponentially increasing radii.
Figure 2B:
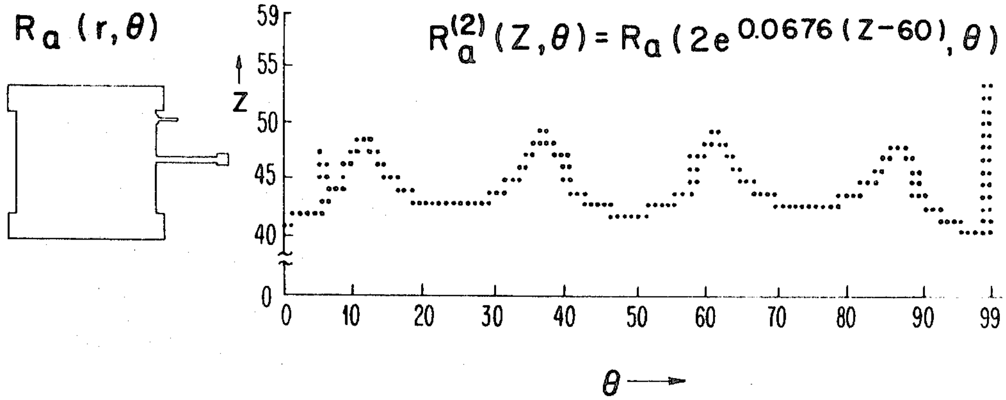
Figure 2C:
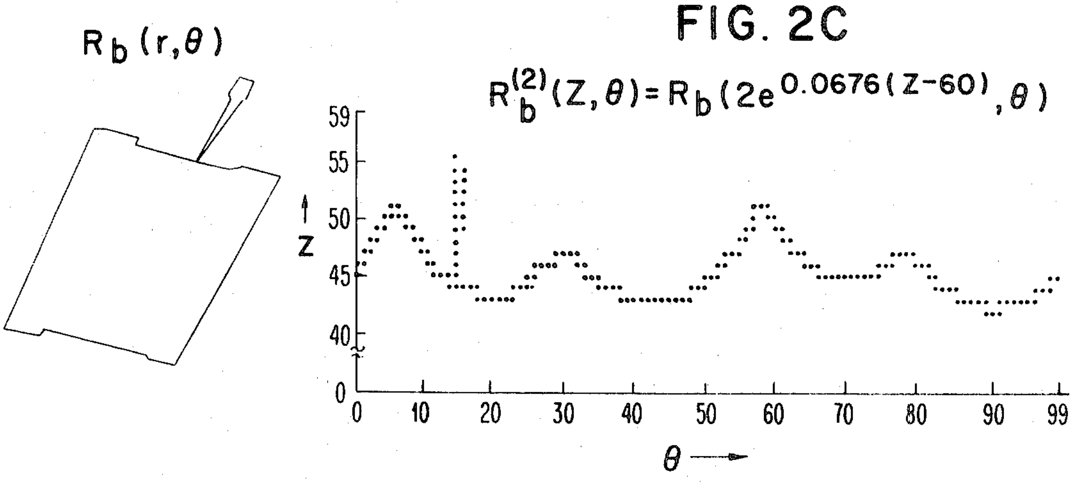
Figure 3A:
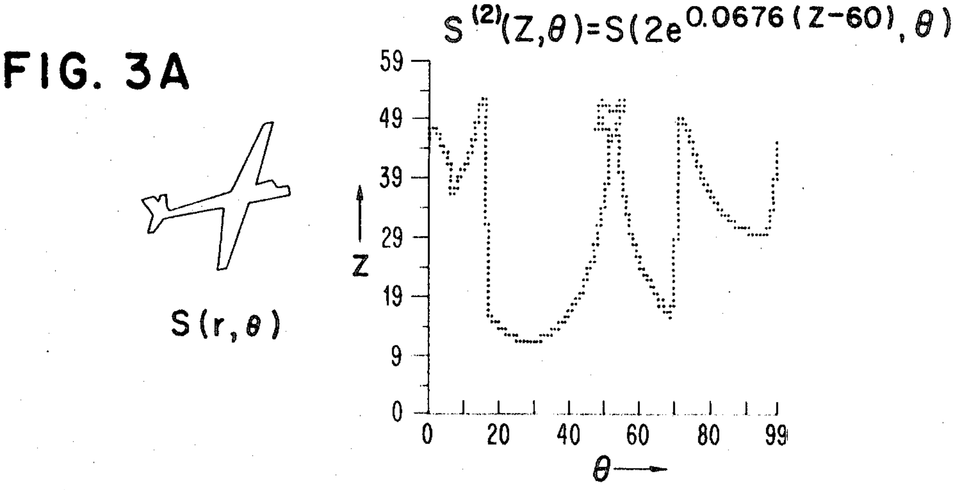
FIGS. 3A–3C are similar representations of airplanes and a cross.
Figure 3B:
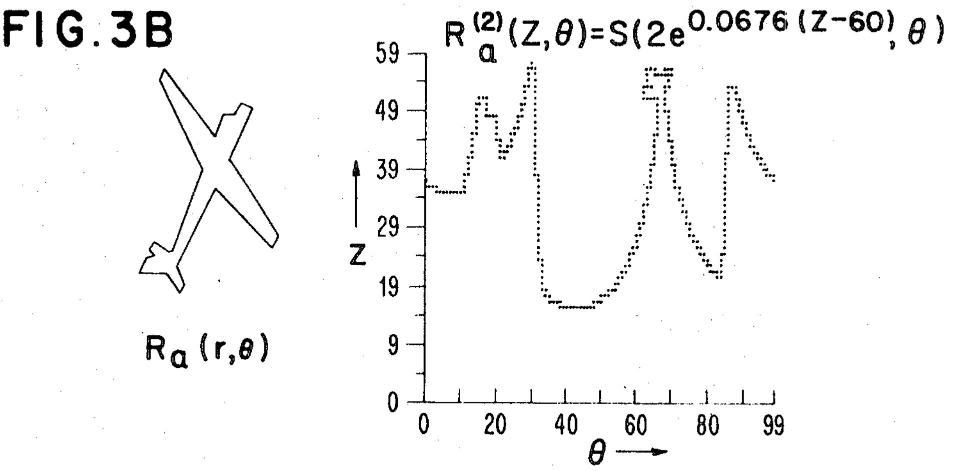
Figure 3C:
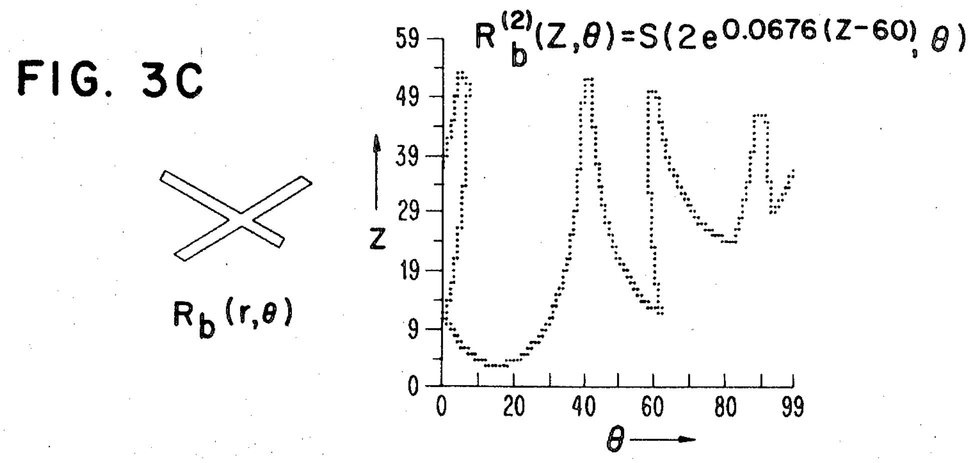

FIGS. 2, 3 and table 1 illustrate an example of the recognition machine operations described above.

Figure 5A:
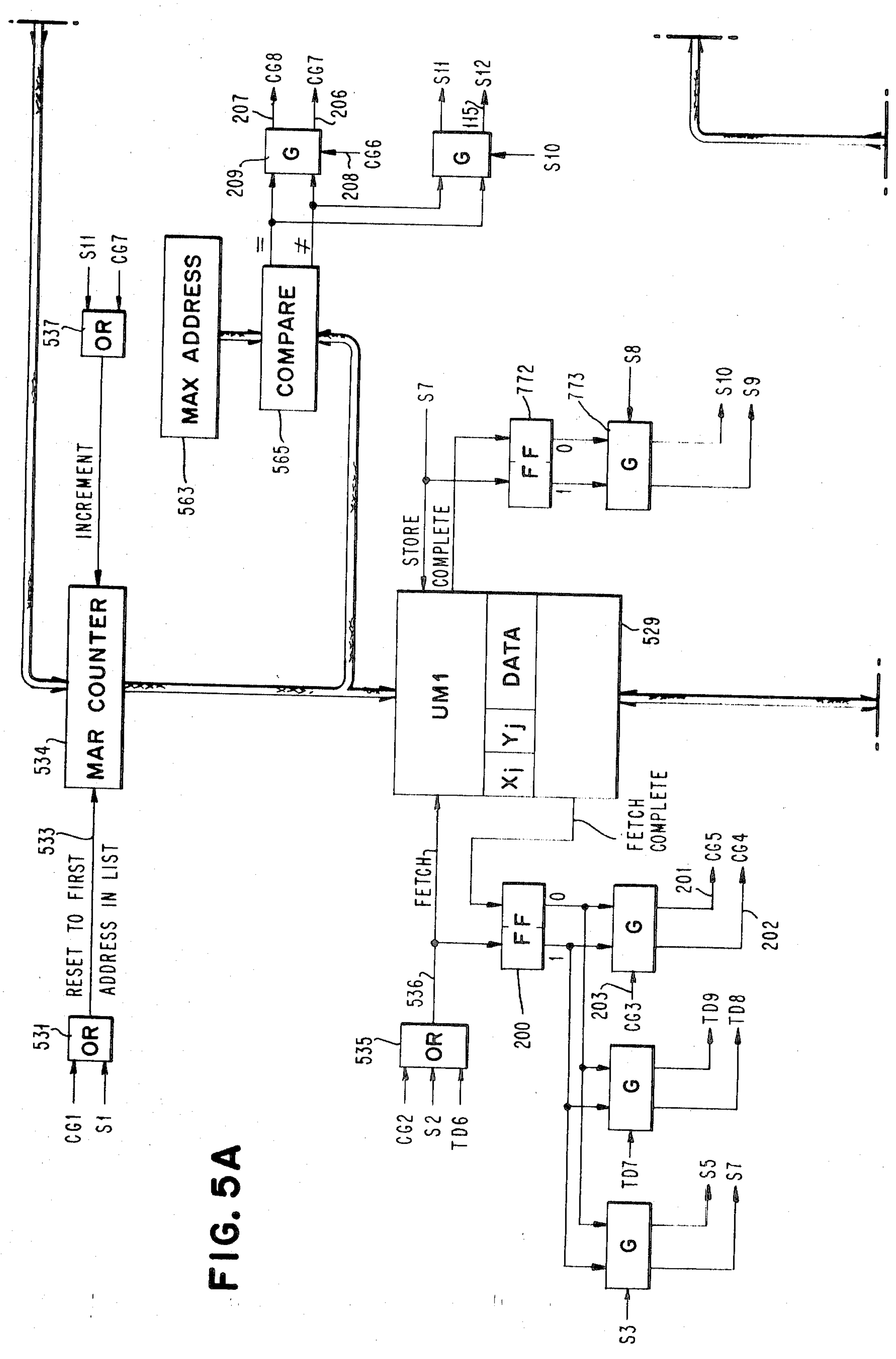
Figure 5B:
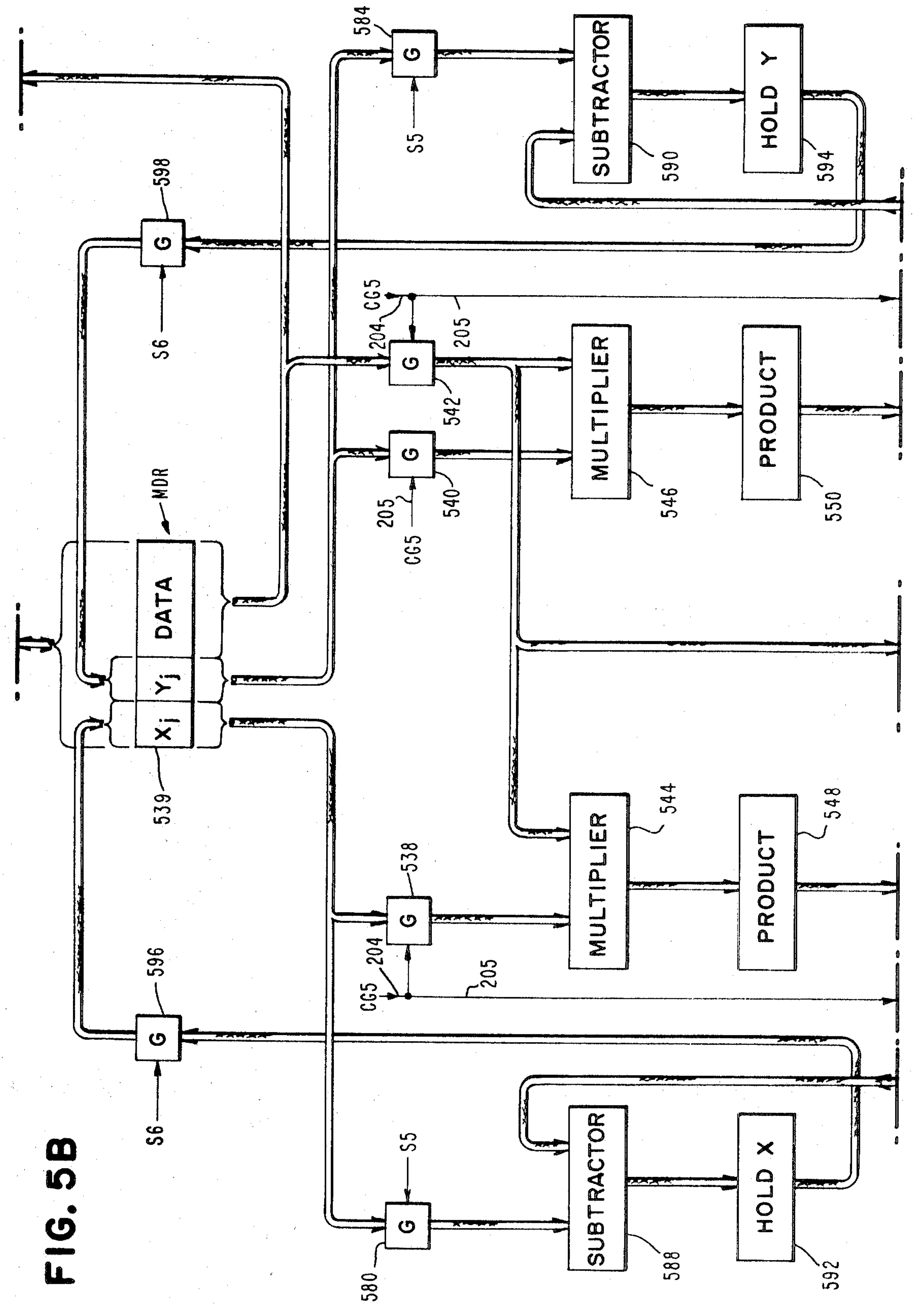

FIG. 2 is an illustration of tank data as it looks in memory UM–1 529 in FIG. 5A and how it looks after being transformed to memory UM–2 210 in FIG. 5B.

FIG. 3 is the same type of illustration for airplanes and a cross.

In table 1 we presented the result of the three nonlinear operations followed by summing operation for the Nth power and "2 to a power" operations. The result of these operations are the three similarity measures $H^D$, $B^{(2)}$ and $M^{(2)}$. The constant K is determined so that $H^D_{S,S}=1$, constant $K_1$ is determined so that $H^D_{R_a,R_a}=1$ and constant $K_2$ is determined to make $H^D_{Rb,Rb}=1$. The rest of the constants are determined similarly. Note that $KH^D_{S,R_a}=K_1H_{R_a,S}$, $K_1H_{R_a,R_b}=K_2H_{R_b,R_a}$ the corresponding equalities hold for $K_3$, $K_4$, $K_5$, and $K_6$, $K_7$ and $K_8$. Table 1 applies to the tank data. Examining columns $H^D_{S,R_a}$ and $H^D_{S,R_b}$ of this table we see that for higher values of $n$ it becomes more apparent that S is more similar to $R_a$ than it is to $R_b$ (discounting scale and rotation). Thus $H^D$ for higher values of $n$ is a more sensitive measure of similarity and differences among patterns and decision functions based on it would yield better recognition results. This fact was also confirmed by us in additional experiments on recognition of alphabetic data.

TABLE I

Table of similarity measures for data on tanks shown on fig. 2

| $n$ | $kH^D_{S,S}$ | $kH^D_{S,Ra}$ | $kH^D_{S,Rb}$ | $k_1H^D_{Ra,Ra}$ | $k_1H^D_{Ra,Rb}$ | $k_2, H^D_{Rb,Rb}$ |
|---|---|---|---|---|---|---|
| 1 | $0.100\times10$ | 0.999 | 0.951 | $0.100\times10$ | 0.952 | $0.100\times10$ |
| 2 | $.100\times10$ | .994 | .771 | $.100\times10$ | .773 | $.100\times10$ |
| 3 | $.100\times10$ | .976 | .456 | $.100\times10$ | .457 | $.100\times10$ |
| 4 | $.100\times10$ | .949 | .200 | $.100\times10$ | .200 | $.100\times10$ |
| 5 | $.100\times10$ | .920 | $.763\times10^{-1}$ | $.100\times10$ | $.764\times10^{-1}$ | $.100\times10$ |
| 6 | $.100\times10$ | .894 | $.282\times10^{-1}$ | $.100\times10$ | $.282\times10^{-1}$ | $.100\times10$ |
| 7 | $.100\times10$ | .871 | $.105\times10^{-1}$ | $.100\times10$ | $.105\times10^{-1}$ | $.100\times10$ |
| 8 | $.100\times10$ | .851 | $.394\times10^{-2}$ | $.100\times10$ | $.398\times10^{-2}$ | $.100\times10$ |
| 9 | $.100\times10$ | .832 | $.150\times10^{-2}$ | $.100\times10$ | $.153\times10^{-2}$ | $.100\times10$ |
| 10 | $.100\times10$ | .815 | $.580\times10^{-3}$ | $.100\times10$ | $.596\times10^{-3}$ | $.100\times10$ |
| 11 | $.100\times10$ | .798 | $.227\times10^{-3}$ | $.100\times10$ | $.235\times10^{-3}$ | $.100\times10$ |
| 12 | $.100\times10$ | .782 | $.895\times10^{-4}$ | $.100\times10$ | $.941\times10^{-4}$ | $.100\times10$ |
| 13 | $.100\times10$ | .766 | $.357\times10^{-4}$ | $.100\times10$ | $.380\times10^{-4}$ | $.100\times10$ |
| 14 | $.100\times10$ | .751 | $.143\times10^{-4}$ | $.100\times10$ | $.155\times10^{-4}$ | $.100\times10$ |
| 15 | $.100\times10$ | .737 | $.579\times10^{-5}$ | $.100\times10$ | $.638\times10^{-5}$ | $.100\times10$ |
| 16 | $.100\times10$ | .723 | $.236\times10^{-5}$ | $.100\times10$ | $.265\times10^{-5}$ | $.100\times10$ |
| 17 | $.100\times10$ | .709 | $.964\times10^{-6}$ | $.100\times10$ | $.111\times10^{-5}$ | $.100\times10$ |
| 18 | $.100\times10$ | .695 | $.396\times10^{-6}$ | $.100\times10$ | $.465\times10^{-6}$ | $.100\times10$ |
| 19 | $.100\times10$ | .682 | $.164\times10^{-6}$ | $.100\times10$ | $.197\times10^{-6}$ | $.100\times10$ |
| 20 | $.100\times10$ | .669 | $.681\times10^{-7}$ | $.100\times10$ | $.836\times10^{-7}$ | $.100\times10$ |
| | $k_3B^{(2)}_{S,S}$ | $k_3B^{(2)}_{S,Ra}$ | $k_3B^{(2)}_{S,Rb}$ | $k_4B^{(2)}_{Ra,Ra}$ | $k_4B^{(2)}_{Ra,Rb}$ | $k_5B^{(2)}_{Rb,Rb}$ |
| | $0.100\times10$ | 0.981 | 0.438 | $0.100\times10$ | 0.448 | $0.100\times10$ |
| | $k_6M^{(2)}_{S,S}$ | $k_6M^{(2)}_{S,Ra}$ | $k_6M^{(2)}_{S,Rb}$ | $k_7M^{(2)}_{Ra,Ra}$ | $k_7M^{(2)}_{Ra,Rb}$ | $k_8M^{(2)}_{Rb,Rb}$ |
| | $0.100\times10$ | $0.884\times10^{-1}$ | $0.382\times10^{-29}$ | $0.100\times10$ | $0.939\times10^{-29}$ | $0.100\times10$ |

$k$, $k_1$, $k_2$, $k_3$, $k_4$, $k_5$, $k_6$, $k_7$ and $k_8$ are constants.

In FIG. 5A, the UM1 memory 529 supplies data to the memory data register 539 including the $X_i$ and $Y_j$ information and data associated therewith. The data is multiplied by the $Y_j$ position and the $X_i$ position in multipliers 544 and 546 (FIG. 5B) in order to provide the product of the data and its X and Y locations relative to the origin. The products are stored in registers 548 and 550 and after an appropriate time delay required for transfer of the products from the multipliers into the product registers 548 and 550, are transferred to the accumulator adders 554 and 556. At the same time an additional accumulator adder 552 is employed to provide a divisor which will be divided into the two products held by the accumulator adders which products will be employed as dividends. The division function will be performed by dividers 572 and 574 whose quotients are provided in $\bar{X}$ and $\bar{Y}$ registers 576 and 578. These quotients constitute the center of gravity location for the data which has been analyzed. The output of the center of gravity quotient registers are, after recentering, as described below, passed up to subtractors 588 and 590. Then the center of gravity is subtracted from each of the $X_i$ and $Y_j$ data locations in order to center the data relative to the center of gravity. While passing from the center of gravity registers 576 to 578 to the subtractors 588 and 590, the values are corrected to be located in the upper right-hand quadrant of a Cartesian, X, Y, graph in order that the center point will be located far enough away from the origin that there is no danger of any negative number being required to be handled by the system. Accordingly, if the field which is to be scanned by the computer is an area of (N+1) by (N+1) units, then the location of the shifted center of gravity will be N divided by two units away from the original origin of the center of gravity. Thus, the two adders 575 and 577 are employed to add a shift of N/2 as indicated in hold registers 902 and 903.

The outputs of the subtractors 588 and 590 are passed to hold X and hold Y registers 592 and 594 and then sequentially into $X_i$ and $Y_j$ registers in the memory data register 539 of the utility memory 1 UM1 529.

Next the information, which includes newly calculated X, Y location information stored in UM1 529 by means of the in the MDR 539 of utility memory 1, 529, is transferred into the MDR 211 (FIG. 5D) of the utility memory 2 210. The translation involves taking the $X_i$, $Y_j$ data and transforming it to a $Z_i$, $\theta_j$ basis. $Z_i$ is an exponentially increasing radius and $\theta_j$ comprises a plurality of angles. The result is a conversion into a scan involving a plurality of radii which are exponentially related and a plurality of angles at which sampling occurs. A table transfer is involved. $Z_i$, $\theta_j$ values are previously included in the utility memory 02 and the values thereof correspond to certain $X_i$, $Y_j$ addresses which are passed from UM2 210 down into the MDR 211 and therefrom into the MAR counter 534 (FIG. 5A) of utility memory 1 UM1 529 to call up the desired X, Y data in UM1 529 for transfer to UM2 210. Then, the UM2 memory 210 may be completely filled with the new data in accordance with the $Z_i$, $\theta_j$ addresses which have been transposed from the $X_i$, $Y_j$ addresses. This data may now be cross correlated as the scan in $Z_i$ and $\theta_j$ has been completed.

In this section we shall describe how the desired address correspondence between UM1 529 and UM2 210 shown in FIGS. 5A and 5B is obtained. The data in UM1 529 is arranged in an X, Y grid, so that X and Y take values from 0 to $n$ and the data is centered around ($n$/2, $n$/2) point. The data in UM1 529 is stored in the following order: if we want to obtain data corresponding to grid point (X,Y) the address which is fed to MAR counter 534 is the combined binary number (XY).

Before the machine starts its operation the UM2 memory 210 will be filled with the desired grid points $Z_i$, $\theta_j$ in each word and the corresponding address in UM1 memory 529 for data transfer. If we want to simulate an annular scan with exponential change in radius we would first choose the grid $Z_i$, $\theta_j$ which we desire. We have $r=de^{c(Z+b)}$ and Z will vary from 0 to $m$, $\theta$ from 0 to $h$. We see that when Z equals zero $r=de^{cb}$ is the smallest value of the radius for which we shall keep data (data for values of Z less than zero are assumed to be zero). For Z equal to $m$, $r=de^{c(m+b)}$ is the largest value of radius for which we shall keep data and we shall assume data is equal to zero for Z larger than $m$. The spacing between radius grid points is proportional to the radius and a function of the constant $c$.

These considerations allow us to choose the constants $d$, $c$, and $b$ to obtain the desired result. For example in FIGS. 2 and 3 we decided to let Z vary from 0 to 60 and $\theta$ from 0 to 99. The largest value we wanted to obtain in radius was 2. Therefore, we let $b$ equal −60 and $d$ equal 2 so that for Z=60 we have $r$=2. A $c$ was chosen to be 0.0676 which gave us the grid indicated in FIG. 2. The step size in $\theta$ for this example was 360°/100 or 3.6°.

Now that we have decided on a grid we shall obtain the corresponding address in UM1. We make the usual conversion from polar to rectangular coordinates, i.e., $X=r\cos\theta$ and $Y=r\sin\theta$. We have to add $n/2$ to each X and Y since the data in UM1 is centered around $(n/2, n/2)$. Thus, if we have $Z_i$, $\theta_j$ the corresponding address in UM1 will be the grid point (X,Y) which is closest to the value $(X^1, Y^1)$ where $X^1=de^{c(Z_i+b)}\cos\theta_j^1 + n/2$ and $Y^1=[de^{c(Z_i+b)}][\sin\theta_j^1+n/2]$, where $\theta_j^1=\theta_j\dfrac{360°}{h+1}$ and $d$, $c$, $b$ are the constants chosen as described above.

Figure 6A:
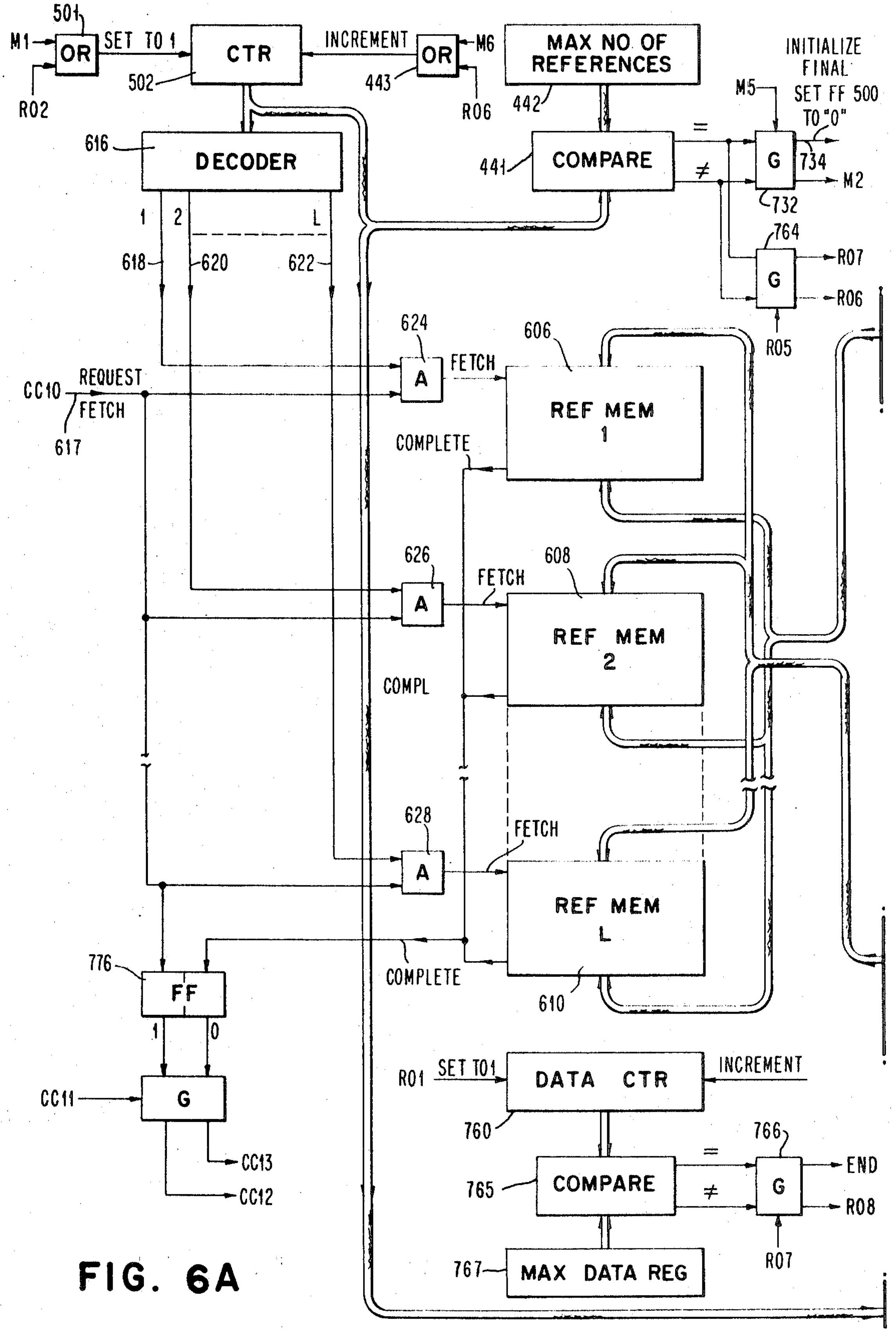
Figure 6B:
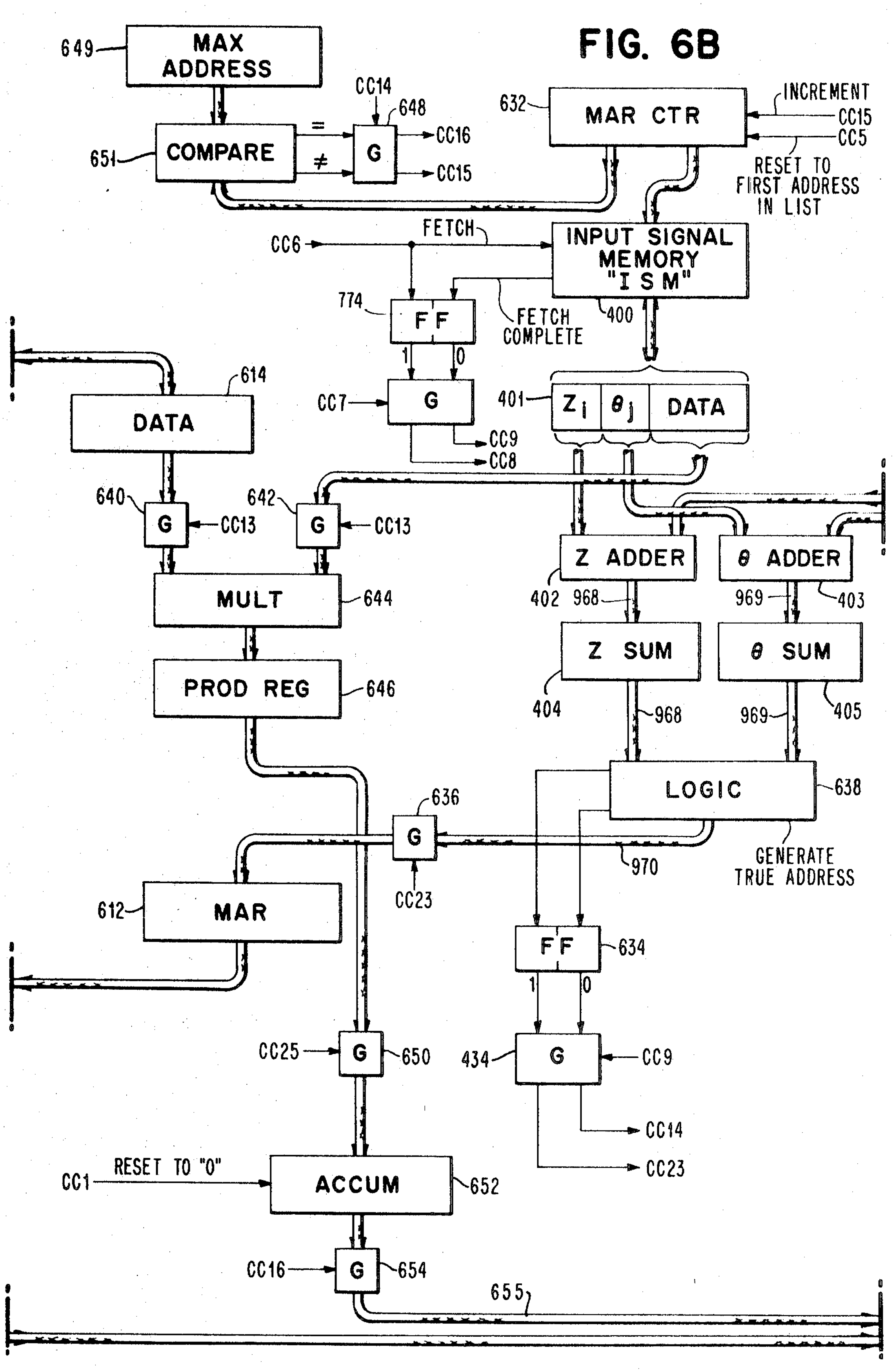
Figure 6C:
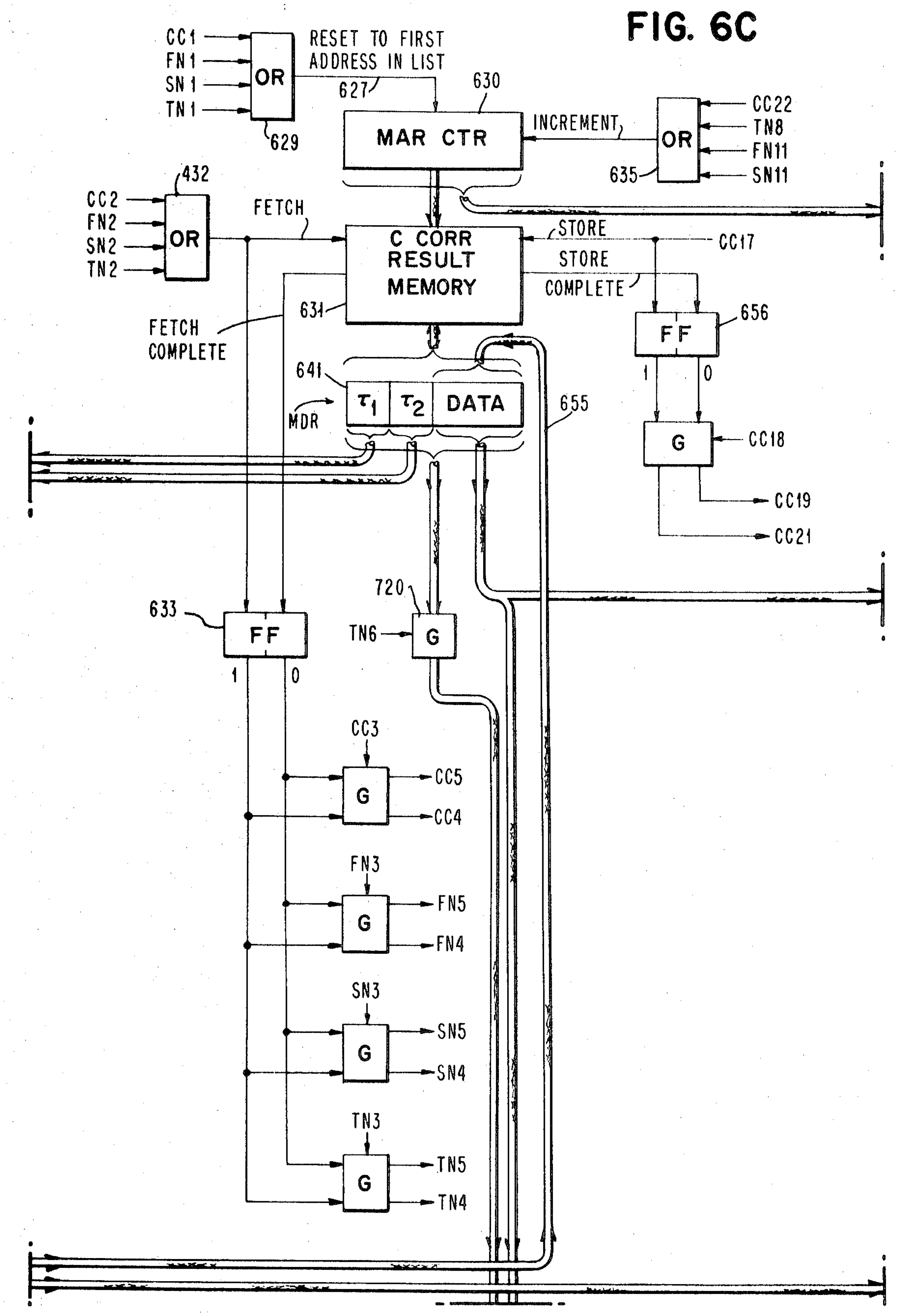
Figures 7, 7A:
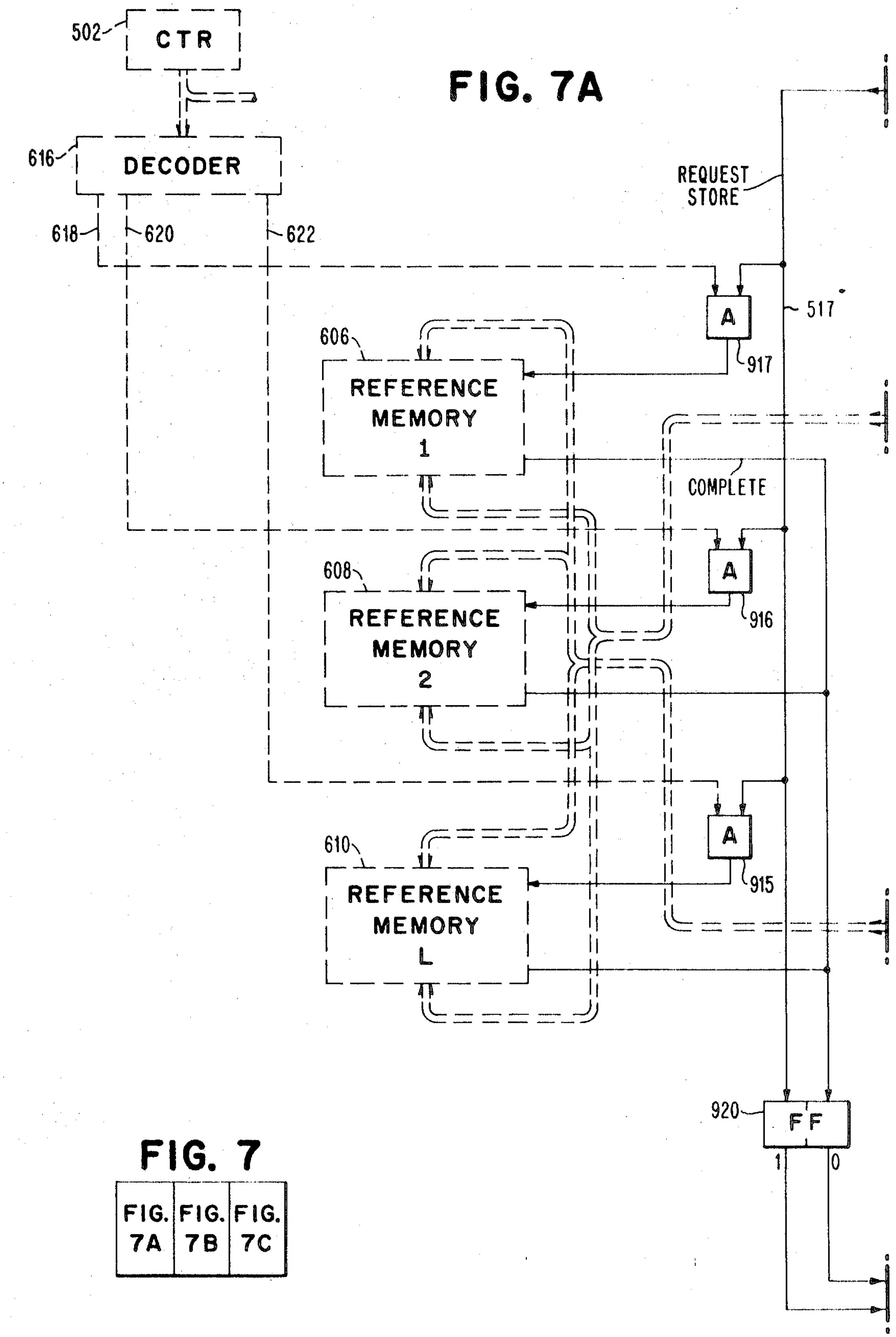
Figure 7B:
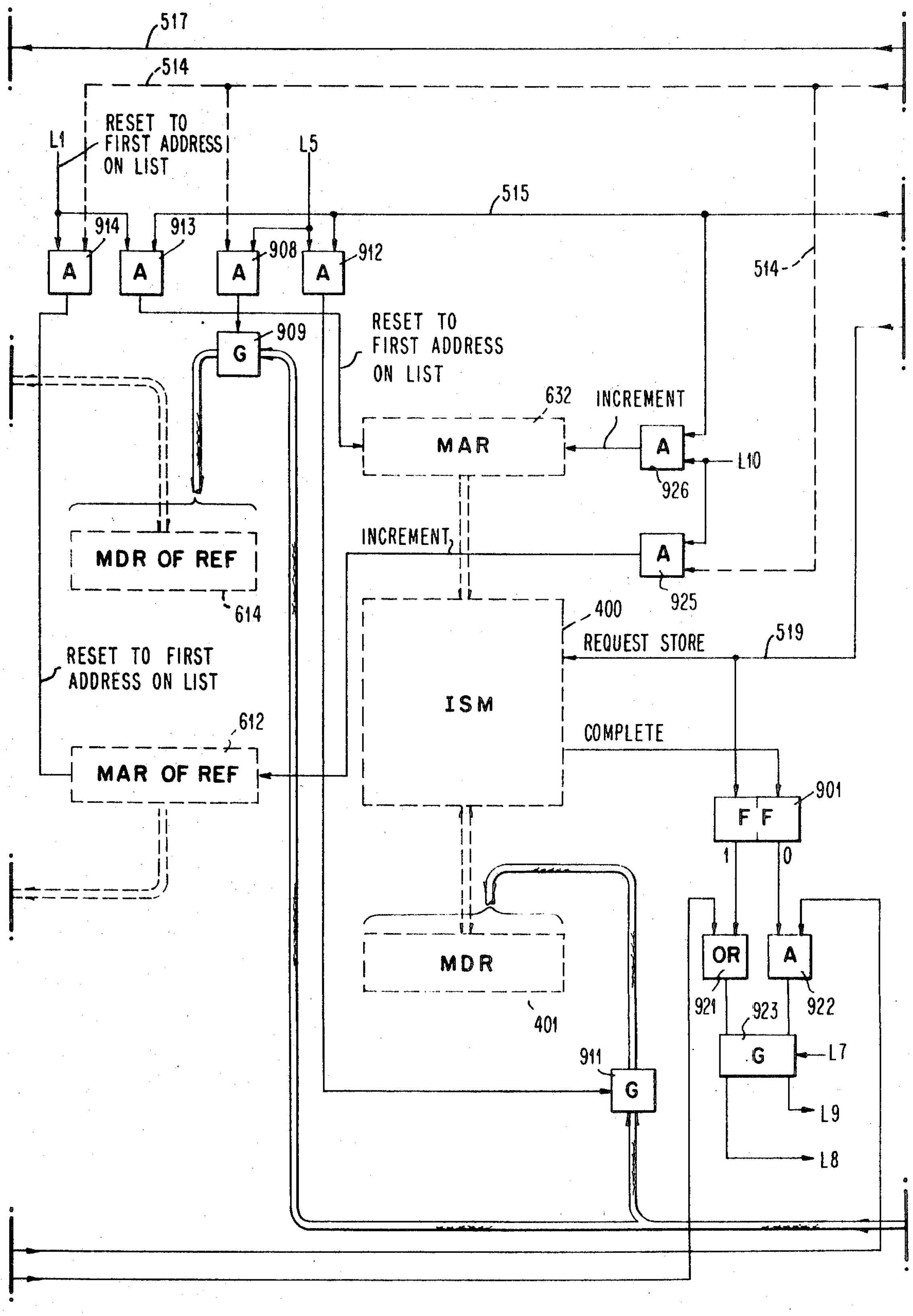

During initialization or training mode of operation of the system, a reference memory table will be recorded for further reference, subsequent to the "scan." Later one employs the information which is produced by means of the exponential "-scan" for cross correlation with the references in the table. Such reference memories are shown in FIGS. 6A and 7A and are indicated as reference memory 1 (606), reference memory 2 (608), up to and including reference memory L (610), L being an independent variable representing the number of kinds of patterns to be identified by means of operation of the equipment. This section of the program is identified as the Load Memory stage 516 in FIG. 4B. It is commenced by operation of stage CL–16 which triggers clock pulse L–1. This operation can either load the reference memory, which comprises the L different reference memories 606, 608 or 610 in FIG. 6A or alternatively during normal operation of the system, the data is loaded into the input signal memory ISM 400 as shown in FIGS. 6B and 7B. This is explained below in connection with FIGS. 7A–7C. The data fed into these two memories is going to be generally speaking for the purpose of this embodiment, comprising R, $\theta$ or $Z_i$, $\theta_j$ type of data which will be fed down into the data register 401 for the purpose of cross correlation with the reference memory information during operation of the program step comprising cross correlation unit 524 on FIG. 4B. During cross correlation, illustrated in FIGS. 6A, 6B and 6C, reference data is correlated or incrementally shifted in one or more axes relative to the input signal until there is no superposition between the reference and the input signal or until it is off the scale. In practice then, the increments $\tau_1$ and $\tau_2$ are stored in the Cross Correlation Result Memory 631, permanently.

The system is operated in such a manner that for each set of values $\tau_1$ and $\tau_2$, the entire list of words in the ISM 400 (FIG. 6B top) is presented seriatim to its MDR 401 for processing to select the appropriate value for use in selecting the desired data position in the reference memory 606, etc. for comparison with the ISM word. Then all such values for a set $\tau_1$, $\tau_2$ are sequentially multiplied and stored in the Accumulator 652 until all words in the ISM 400 have been processed for that set of $\tau_1$, $\tau_2$. Then, the data sum is transferred via MDR 641 into the position next to $\tau_1$, $\tau_2$ in the cross correlation result memory 631. Then cross correlation values are calculated for all other values of $\tau_1$, $\tau_2$ and stored in juxtaposition therewith in the Result Memory 631.

Subsequently, after the nonlinear operation has been completed, then the next reference will be cross correlated, etc.

In calculating the Nth power, the results of the cross correlation stored in the Result Memory 631 (FIG. 6C) must be multiplied point by point by themselves until they have been multiplied N times. Thus, the Result Memory Data values are read out point by point from MDR 641 into the Result Register 668 (FIG. 6F top) and the Nth power register 678 to be multiplied together in Multiplier 686. The result of such multiplication is stored in the Product Register 688 and then transferred into the Result register 668 so that the value in the Nth power register 678 can raise the value in the Result Register 668 one more power upon multiplication again in Multiplier 686. This continues until the multiplier has been operated N times as measured by the Nth Power Counter 680 in FIG. 6D top. Thus, the output for that point in the Result Memory 631 has been raised to the Nth power and it can then be gated into the Accumulator 664. All points in the Result Memory 631, i.e. for a single reference, are passed into the Nth power unit for multiplication and ultimately all are summed in Accumulator 664.

Figure 6D:
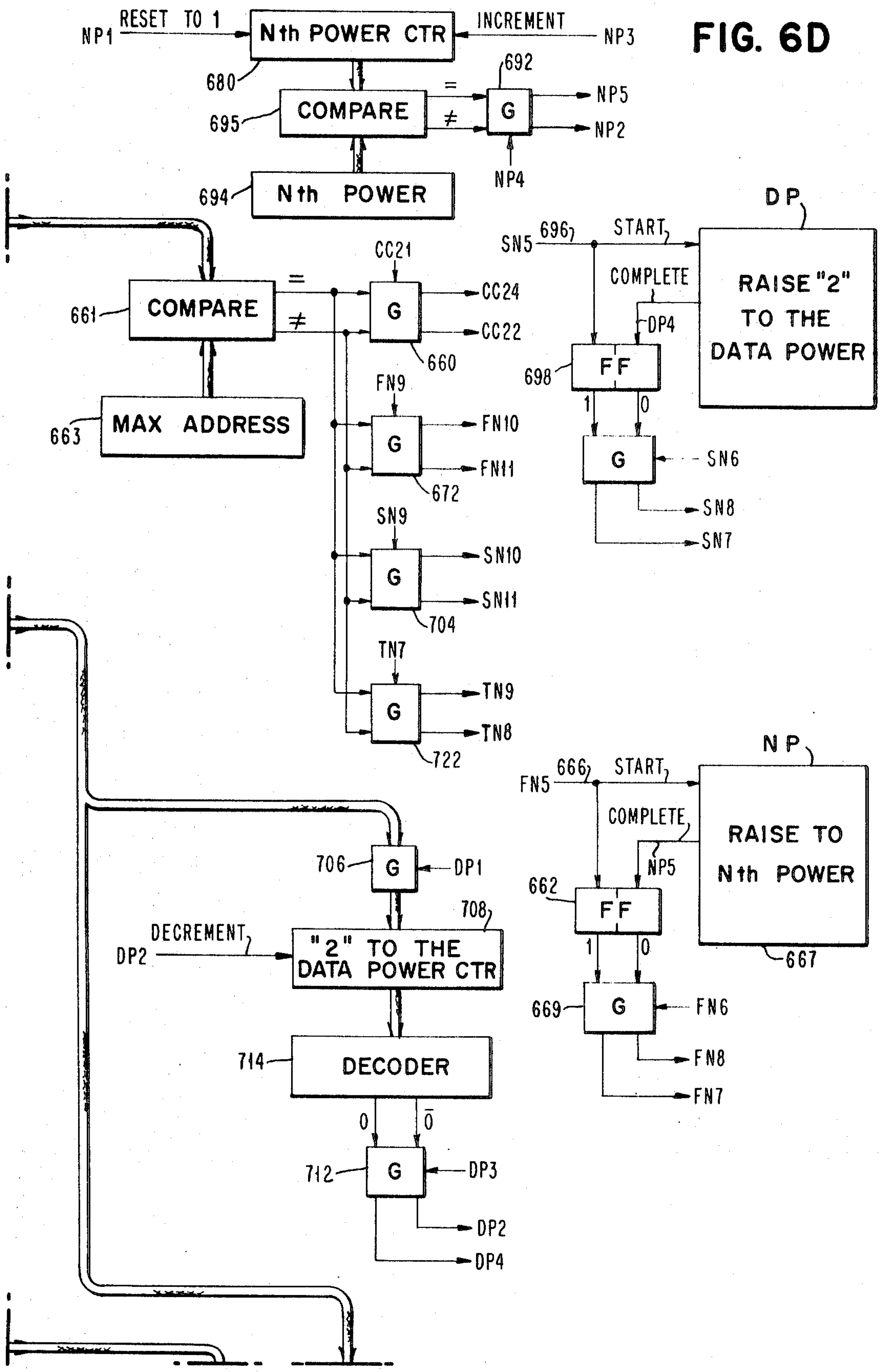

In the case of raising 2 to the Data Power, there is the procedure of taking the value of each point in the Result Memory into the "2" to the Data Power Counter 708 (FIG. 6D, lower). At the same time binary shift register 702 (FIG. 6F center) is reset to zero and then to 1, so that upon its first shift, 2 will be raised to a power. Here, the power will equal the value in the Data Power Counter 708. When the data power counter 708 has been decremented by enough "1's" to equal zero, then the value in the shift register 702 will equal the data power of 2. Then that value and all subsequent values can be added into the accumulator 664 until the sum or integral of the powers of all outputs of a cross correlation with a single reference have been obtained, when the memory address counter 630 (FIG. 6C top) has been directed to all addresses on the list as indicated in maximum address register 663, FIG. 6D.

Figures 6, 6E:
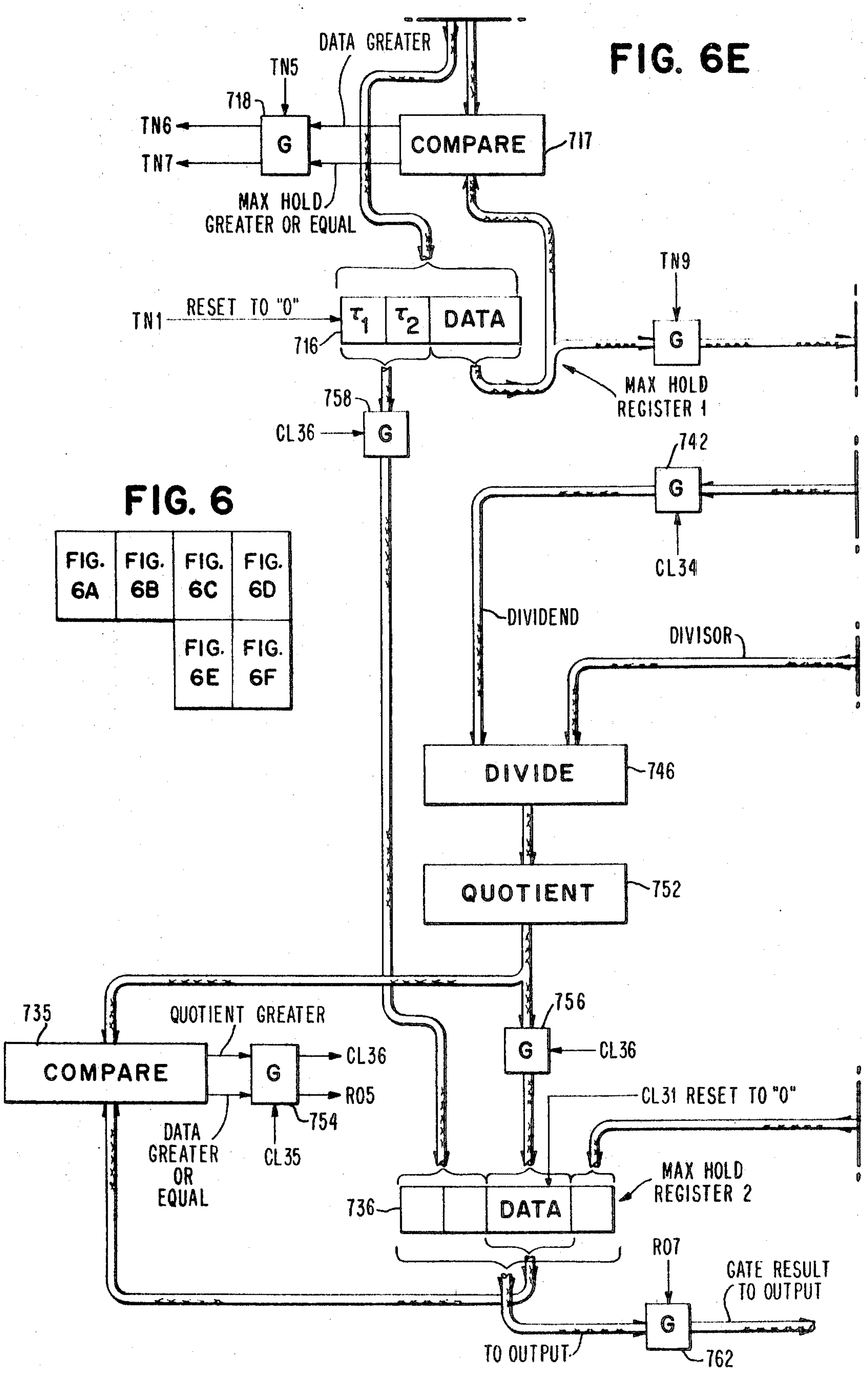

In the final case, of maximum operation, the cross correlation result values in the Result Memory 631 FIG. 6C are serially compared to the values in the MAX Hold Register No. 1 716 in FIG. 6E, top left, serially and if larger are transferred into the MAX Hold Register No. 1 716 (below it).

A larger value is caused to replace any smaller value in the Register 716. Then when the entire set of cross correlation results have been scanned and the largest one has been selected, the value is transferred to Accumulator 664 (FIG. 6F) and the operation is completed under control of the compare circuit 661, as above.

In the initial mode of operation of the system, the result stored in the accumulator 664 is prepared for use as a normalization value for each of the references. The square root of the sums is taken in square root unit 726 (FIG. 6F) and are stored in the normalization factor memory 438 in juxtaposition and in the same word with the I value or reference number from the reference memory counter 502.

In regular operation of the system, after the nonlinear sums or the maximum value has been stored in the Accumulator 664, the value is passed into the Divide Unit 746 as a dividend and each of the corresponding reference Divisors is secured from the normalization memory 438 to yield a quotient in register 752, the largest of which is stored in MAX Hold Register No. 2 736 along with the numeric identification of the pattern, in a manner similar to that described above. In addition, in the case of maximum value, the values $\tau_1$ and $\tau_2$ will pass down to MAX Hold Register No. 2 736 to indicate rotation, size, etc.

In logic box 638 we shall use either logic box I, shown in FIG. 8, or logic box II, shown in FIG. 9, depending on the need as described below.

Logic Box I

Both in the input signal memory and the reference memories we have data for each grid point $(Z_i, \theta_j)$. The values of the grid points $Z_i$ and $\theta_j$ run from zero to $n$. We assume same number of points each for simplicity of presentation only. Let us now discuss the case when a function of $Z_i$ determines the radius coordinate and a function of $\theta_j$ determines the angle coordinate. We shall always assume that for $Z<0$ the value of the data is zero (note that since $r=de^{c(Z+b)}$ the constants can be adjusted so that $r$ corresponding to $Z=0$ is as small as we please). We shall also assume that for $Z>n$ the data is zero (equivalent to the assumption that the background of a picture is white). Therefore, in the cross correlation operation when the Z sum is either less than zero or larger than $n$, the data being zero, there is no point gating it to the accumulator and we set flip-flop 634 to zero which is a request for another fetch from ISM memory. If Z is between zero and $n$ thus we want to obtain data from the reference memory we have to make sure that $\theta$ is at a value which exists in the memory, since we keep values of $\theta$ from 0 to $n$ only. Value 0 corresponds to 0° and we increment the angle in steps of $360°/n+1$. When we obtain a value of $\theta$ sum larger than $n$, (for example $\theta$ equal to $n+1$, what we really need for cross correlation is the data for $\theta=0$) we should subtract ($n+1$) to obtain the correct grid point and if we obtain a negative $\theta$ sum we should add ($n+1$) to obtain the correct grid point. Otherwise, if $\theta$ is between 0 and $n$ it is gated without alteration.

Logic Box II

When that data in ISM memory and reference memories is in a rectangular grid we store values of 0 through $n$ in both coordinates and we assume that the data is zero outside the grid. Thus if Z is less than zero or $\theta$ less than zero or $Z>n$ or $\theta>n$ the data will be zero and we should call for another fetch from memory ISM, otherwise we gate address to MAR 612.

TIMING OF SYSTEM

While the general functional relationships and functions of the microprograms are described above, the detailed functional and timing relationships between units are described at length below for the purpose of clarifying the mode of cooperation between the elements of the system.

FIGS. 5A–5D, 6A–6F, 7A–7C, 8A–8B and 9 are additional flow diagrams, which show the detailed operations indicated by FIGS. 4A and 4B. When operation of the machine is started, flip-flop 500 (FIG. 4B) is set to "1" by a switch.

Reference should next be made to the Timing Sequence Table below relative to the "initialization master clock" which is abbreviated "M," for the purpose of determining the details of the initialization timing sequence.

An M–1 pulse is then applied to the "reference memory counter" 502 on FIG. 6A in order to set it to "1." Pulse M–1 also sets the MAR Counter 436 (FIG. 6F) to "1" or the first address on the list in the NFM memory 438. The M clock then advances to stage M–2. A pulse M–2 is applied to line 504 on FIG. 4A. This starts the operation entitled "load UM–1 from data acquisition source." This is an operation which loads the data from the source which could be a scanner, or some other means, into the utility memory UM–1. No detailed hardware is shown for this loading operation as such operations are well known. When the M–2 pulse is applied to line 504, it will be noted that flip-flop 506 is set to its "1" state. The clock then advances to clock stage M–3.

A pulse M–3 is applied to gate 508 in order to test for completion of the above data loading operation. When the loading operation is completed, flip-flop 506 will be set to its "0" state. It will be noted that as long as flip-flop 506 is in its "1" state that the clock will advance to stage M–4 which stage is employed for delay only and returns the clock to stage M–3. When flip-flop 506 is finally set to its "0" state, the clock will branch to another clock CL at its stage CL–1. The remaining portions of FIGS. 4A and 4B are concerned with the operation of a microprogram which is controlled by clock CL. The clock pulse CL–1 is applied to line 510 in order to start the clock CG to activate mechanism 511 which computes the center of gravity. When the computation for the center of gravity is completed, as indicated by pulse CG–10 on line 212, the clock will branch to stage CL–4. A pulse CL–4 is applied to line 512 which starts clocks to control the computation of the Center Data unit 513 which subtracts the center of gravity from every data point location index and stores the data in memory with the coordinate origin coinciding with the center of gravity, displaced by $n/2$ as described elsewhere. When this computation is completed, the clock pulse S–12 on line 115a will cause the system to branch to stage CL–13.

Clock pulse CL–13 starts the clock TD for Translator 520 which transfers data to a new table in memory according to a stored address correspondence.

When pulse TD–15 signals that this operation is completed, the clock will branch to stage CL–16 which applies a pulse on line 125 to start clock L to start the Load Memory unit 516 to "load reference memory and/or input signal memory" data into corresponding memories. On FIG. 4B it will be noted that during the initialization period when "references" are being processed, that flip-flop 500 is in its "1" state. A control line 514 extends from the "1" side of flip-flop 500 to the Load Memory unit 516. During the initialization period, the data generated by the operation of the translator 520 will be transferred both to the reference memories 606, 608 and 610 (FIG. 6A) and to the input signal memory 400 (FIG. 6B) under control of the control line 514. When the machine is through with its initialization mode and goes into its regular operation, the data generated by the translator 520 will only be transferred into the input signal memory 400 under the control of line 518 which extends from the "0" side of the flip-flop 500. It should be mentioned that when the data is loaded either into the reference memories 606, 608, 610 et seq. or into the input signal memory 400 that the address field which was part of the memory word as it existed in the memory referred to in the translator 520 is omitted.

When the loading operation just referred to, controlled by clock L, is completed, the clock pulse L–9 on line 126 causes the system to branch to stage CL–19 which produces a pulse applied to line 522 in order to initiate the operation of the cross correlation clock CC in the cross correlation unit 524. Cross correlation occurs between the contents of the reference memories 606 et seq. and the input signal memory 400 and will be described in detail later.

When the cross correlation is completed, the clock pulse CC–24 on line 525 will cause the system to branch to stage CL–22 which applies a pulse to line 526 in order to start the desired nonlinear operation on the cross correlation indicated by the nonlinear operation unit 528. This embodiment describes three different nonlinear operations, one of which will be chosen.

When the desired nonlinear operation on the cross correlation is completed, a pulse on line 529 will cause the clock to branch to stage CL–25. During the initialization period, AND circuit 530 (FIG. 4B) will be enabled, because flip-flop 500 is in its "1" state. The CL–25 pulse will then be effective to produce a clock pulse CL–26 on line 431. When the initialization period is over, AND circuit 532 is enabled by flip-flop 500 and a clock pulse CL–25 will produce a clock pulse CL–31 on line 433.

The first operation to be described in detail will be the operation for computing the center of gravity. Reference should be made to the timing chart below with reference to the microprogram entitled "center of gravity" clock which is abbreviated "CG."

The "CG" clock is started by the CL–1 pulse applied on line 510 (FIG. 4A).

Figures 5, 5C:
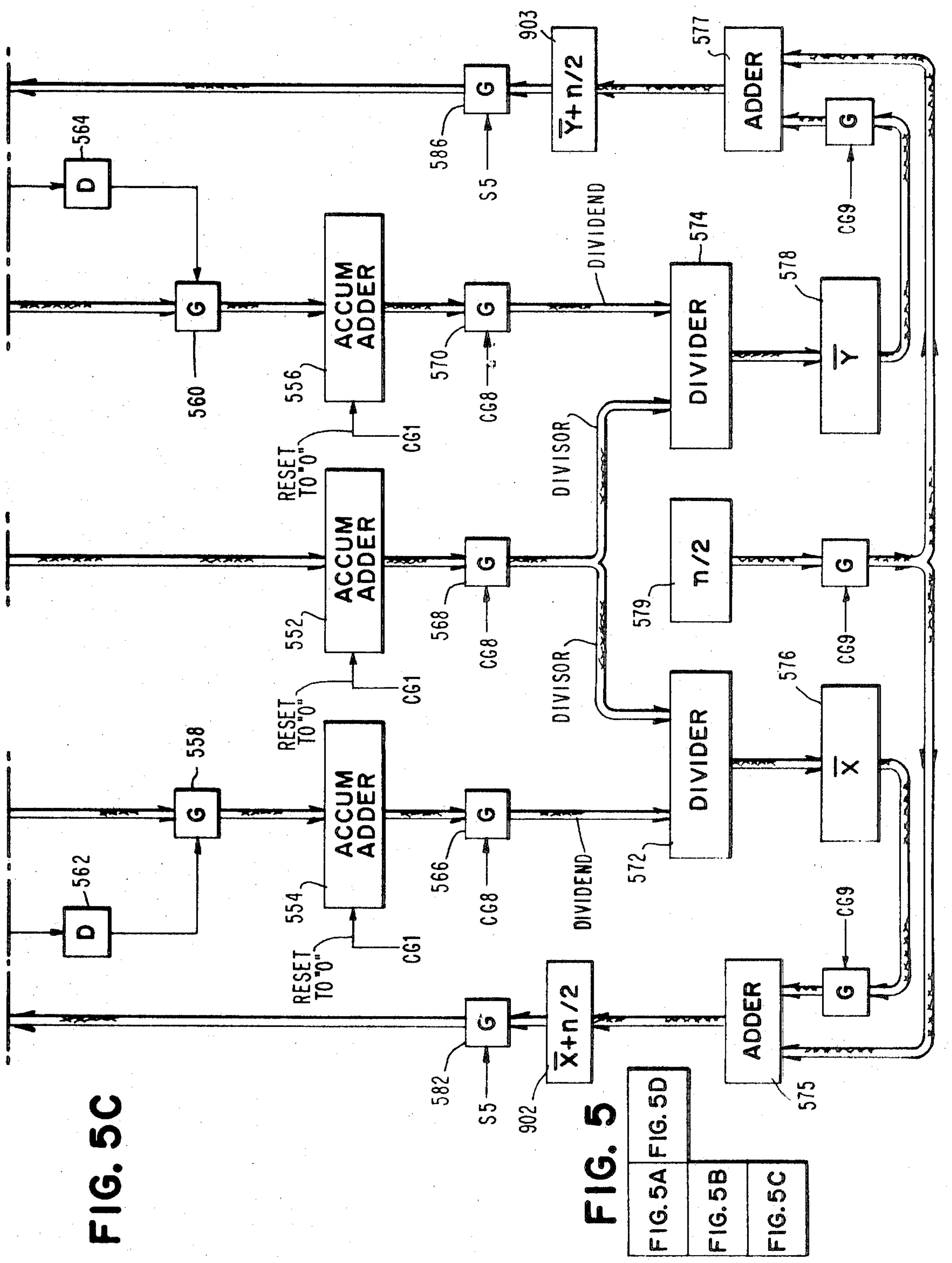

On FIG. 5A the CG–1 pulse is applied to the MAR counter 534 of the memory UM–1 in order to reset it to the first address on the list. The CG–1 pulse also resets to "0" the accumulator adders 554, 552 and 556 (FIG. 5C). The clock advances to stage CG–2.

The CG–2 pulse is applied via OR gate 535 to line 536 in order to request an access to fetch data from memory UM–1 529. At the same time, flip-flop 200 is set to its "1" state. When the fetch is complete, the CG clock branches to stage CG–5 which produces a pulse applied to lines 204 on FIG. 5B.

The CG–5 pulse is applied to gate 538 in order to gate the $X_i$ field of the memory data register, MDR, 539 of memory UM–1 529, to the multiplier 544. The CG–5 pulse is also applied to gate 540 in order to gate the $Y_j$ field of the MDR 539 of the memory UM–1 529 to the multiplier 546. The other inputs to the multipliers 544 and 546 are supplied by the gate 542 which, when the CG–5 pulse is applied to it, gates the "-data" field of the MDR 539 of the memory UM–1 to the multipliers 544 and 546. It will be noted that this same "data" field is also gated to the accumulator adder 552. It will be noted that the product formed by the multipliers 544 and 546 are placed in the product registers 548 and 550, respectively. Delayed CG–5 pulses are applied to gates 558 and 560 in order to gate the product register 548 to the accumulator adder 554 and also to gate the product register 550 to the accumulator adder 556. The CG–5 pulses are delayed by the delay circuits 562 and 564 to permit completion of the multiplication before transfer of the product.

The clock then advances to stage CG–6 which is used in FIG. 5A to produce a pulse to test the output of the compare unit 565 between the MAR counter 534 of memory UM–1 and the MAX address register 563 by operating gate 209. If the result of the comparison is unequal, a signal on line 206 causes the clock to continue to CG–7. If the result is equal, a signal on line 207 causes the clock to branch to stage CG–8. CG–7 clock pulses are used to increment the MAR counter 534 of memory UM–1 529, via OR 537.

The CG–8 pulse is applied to gates 566, 568 and 570 (FIG. 5C) in order to supply data to the dividers 572 and 574. The $\overline{X}$ and $\overline{Y}$ quotients developed by these dividers are stored in the $\overline{X}$ and $\overline{Y}$ hold registers 576 and 578, respectively.

The clock pulse CG–9 then adds the outputs of *n*/2 register 579 and hold registers 576 and 578, respectively, into adders 575 and 577 respectively and thence into hold $\overline{X}+n/2$ register 902 and hold $\overline{Y}+n/2$ register 903. The clock pulse CG–10 then leads to stage CL–4.

Reference should next be made on the timing chart below to the "subtract" clock sequence which is abbreviated "S." This clock is started by a pulse CL–4 (FIG. 4A).

Referring to FIG. 5A, the S–1 clock pulse is applied via OR gate 531 and line 533 to the MAR counter 534 of memory UM–1 529 in order to reset it to the first address on the list. The S–2 pulse applied to OR gate 535 and via line 536 to memory UM–1 529 is used to request access to fetch data from memory UM–1 529. When the access is completed, the clock will branch to stage S–5. The S–5 pulse is applied to gates 580, 582, 584 and 586 in FIGS. 5B and 5C in order to feed the subtractor circuits 588 and 590. The results of the subtractions provided thereby are held in hold X and hold Y registers 592 and 594, respectively (FIG. 5B).

The S–6 pulse is applied to gates 596 and 598 (FIG. 5B) in order to gate the hold X register 592 to the $X_i$ field of the MDR 539 of memory UM–1 529. The hold Y register 594 is also gated to the $Y_j$ field of the same MDR or memory data register 539.

The S–7 pulse is used to request access to store data in memory UM–1 529. When this access is complete, flip-flop 772 and gate 773 will be shifted to cause the clock to branch to stage S–10. The pulse S–10 is used to test the MAR counter 534 of memory UM–1. If the value in MAR counter 534 is not equal to the value in the MAX address register 563 the clock will continue to stage S–11. If it is equal, the clock will branch to stage S–12. A pulse S–11 is connected via OR gate 537 to increment the MAR counter 534 of memory UM–1 529. Pulse S–12 is used to reset flip-flop 116 (FIG. 4A) to its "0" state.

The next operation to be explained is the one entitled "-Translator" 520 in FIG. 4B, which performs to transfer data to a new table in memory according to a stored address correspondence. Reference should be made on the timing chart below to the TD microprogram clock sequence which is started by a pulse CL–13 as shown in FIGS. 4A and 5.

Figure 5D:
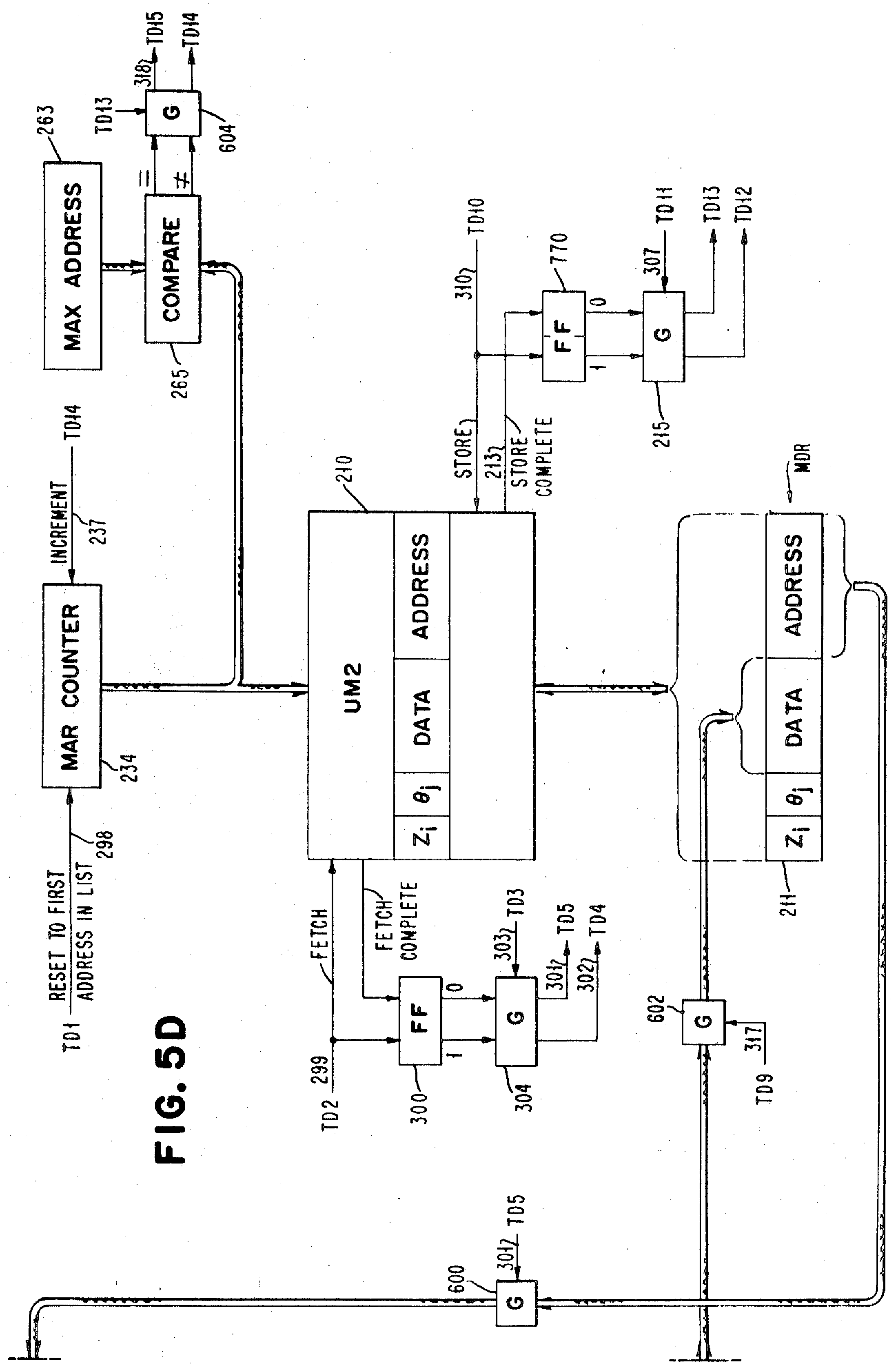

The TD–1 pulse (FIG. 5D) is used to reset the Mar. counter 234 of the memory UM–2 210 to the first address on the list. A pulse TD–2 on line 299 requests a "fetch" from memory UM–2 and a pulse TD–3 on line 303 tests for completion of the "fetch" operation. When the fetch is complete, the clock branches to stage TD–5 on line 301. Pulse TD–5 is applied to gate 600 in order to gate the address field of the MDR 211 of memory UM–2 210 to the MAR counter 534 of memory UM–1 529. Pulse TD–6 is applied via OR gate 535 (FIG. 5A) to request the "fetch" of memory UM–1 and when the "fetch" operation is complete, the clock branches to stage TD–9, (FIG. 5D). A pulse TD–9 is applied on line 317 to gate 602 in order to gate the data field of the MDR 539 of memory UM–1529 to the data field of the MDR 211 of memory UM–2 210. TD–10 is applied on line 310 to request performance of a "store" operation by memory UM–2 210. When this is completed, as indicated on line 213, the flip-flop 770 is zeroed and gate 215 causes the TD clock to branch to stage TD–13. Pulse TD–13 is applied to gate 604 (FIG. 5D) in order to test the MAR counter 234 of memory UM–2 210. If the MAR counter of memory UM–2 is not equal to the value in the MAX address register 263, the clock will advance to stage TD–14 under control of compare circuit 265, and gate 604. If it is equal, the clock will branch to stage TD–15. Pulse TD–14 is used to increment the MAR counter of memory UM–2. Pulse TD–15 is used to reset flip-flop 122 (FIG. 4B) to its "0" state, via line 318, a single shot (not shown) and line 318*a*.

The next operation is that shown on FIG. 4B by the load data unit 516. This operation was described previously. When this operation is over, the clock advances to stage CL–19 which is used to start the "cross correlate" operation.

Referring to FIG. 6A, three reference memories representing a plurality are shown. They include a reference memory "1" 606, a second reference memory "2" 608, and a last reference memory "L" 610. There are as many reference memories as there are references, be they characters, vehicles, images, etc. A memory address register 612 which is shown on FIG. 6B is used for all of the reference memories. A memory data register 614 on FIG. 6B is also used for all of the reference memories. This is possible, because only one of the reference memories is used at any one time. The reference memory counter 502 at the top of FIG. 6A feeds the decoder 616. Only one output line of the L output lines of the decoder can be active at any one time. For example, if wire 618 is active, it will be possible to request a fetch from the reference memory 01 606 because the AND circuit 624 can be enabled by line CC–10, 617. If line 620 is active, AND circuit 626 will be enabled and it will be possible to request a "fetch" from reference memory 02 608. If wire 622 is active, AND circuit 628 will be enabled which will make it possible to request a fetch operation of the reference memory "L" 610. In other words, the reference memory 606 et seq. that will be used, will depend on the setting in the counter 502.

Reference should next be made to FIGS. 6A–6F along with the microprogram entitled "cross correlate clock" which is abbreviated "CC," and whose timing sequence is outlined on the chart below.

The CC–1 pulse is used on FIG. 6C to reset the MAR counter 630 via OR 629 and line 27 of the result Memory 631 to the first address in the list. The CC–2 pulse is used to request access to "fetch" from the result memory 631 via OR gate 432. When the access is complete, the clock will branch to stage CC–5. The CC–5 pulse is applied to the MAR counter 630 of the ISM memory 400 in order to reset it to the first address on the list. Pulse CC–6 is used to request access to "-fetch" from the ISM memory 400. When this is complete, the clock branches to stage CC–9. On FIG. 6B the CC–9 pulse is used via gate 434 to test flip-flop 634. If this flip-flop is on "0," the CC clock branches back to stage CC–6. If it is on "1," the CC clock branches forward to stage CC–23. If the clock branches to stage CC–6, then data included in the "fetch" from the ISM memory 400 is ignored and another fetch is requested. If the clock branches forward to stage CC–23, then this pulse is applied to gate 636 in order to gate the output of the logic unit 638 to the MAR 612 of the reference memories 606–610. The operation of the logic unit 638 is described below. From stage CC–23 the CC clock branches back to stage CC–10. On FIG. 6A the CC–10 pulse is applied on line 617 to request a fetch from the reference memory indicated or "pointed to" by the decoder 616. CC–11 tests for completion of the "fetch" operation. When the operation is complete, the clock will branch to stage CC–13. Pulse CC–13 is applied to gate 640 in order to gate the data register 614 of the reference memory to the multiplier 644. Pulse CC–13 is also applied to gate 642 in order to gate the "data" field of the MDR of the ISM memory to the multiplier 644. The product will appear in the product register 646. From stage CC–13, the clock branches to stage CC–25. Pulse CC–25 is applied to gate 650 in order to gate the product register 646 to the accumulator 652. From stage CC–25, the clock branches back to stage CC–14. At the upper left corner of FIG. 6B, the CC–14 pulse is applied to gate 648 in order to test the MAR counter 632 of the ISM memory 400 by a maximum address register 649 and a compare circuit 651. If the counter 632 is not equal to the MAX address register 649 value in register 649, the clock will continue to stage CC–15. If the counter 632 is equal to the MAX address value, the clock will branch to stage CC–16. Stage CC–15 is used to increment the MAR counter 632 of the ISM memory 400. The CC–16 pulse is applied below to gate 654 in order to gate the product register 646 output in accumulator 652 via cable 655 to the "data" field of the MDR 641 of the result memory 631. Pulse CC–17 is used to request the result memory 631 to store data. It also sets flip-flop 656 to "1." When the "store" operation is completed, the clock branches to stage CC–21. On FIG. 6D the CC–21 pulse is applied to gate 660 to compare circuit 661 in order to test for equality of the value in the MAR counter 630 to the value in the MAX address register 663. If the counter value is not equal to the MAX address value, the clock will continue to stage CC–22. If the counter value is equal to the MAX address value, the clock will branch to stage CC–24. Stage CC–23 is described above. Pulse CC–24 is applied on "complete" line 525 to flip-flop 658 (FIG. 4B) in order to reset it to its "0" state.

On FIG. 4B, the CL–clock will not advance to stage CL–22 which, via gate 659 and clock pulse CL–20 causes pulse CL–22 to be applied to line 526 in order to start the computation of the desired nonlinear operation on the result of the cross correlation computation. Three different nonlinear operations are described. Only one of them would be used at any one time.

Attention should next be directed to the timing table with reference to the FN clock entitled "first nonlinear operation on cross correlation," which is abbreviated to FN. Attention should also be directed to the NT clock entitled "raise to $N^{th}$ power clock," abbreviated to NT. The NT clock is a subroutine of the FN clock.

Referring to the top of FIG. 6C, the FN–1 pulse is supplied via OR gate 629 to reset the MAR counter 630 of the result memory 631 to the first address in the list. On the left middle of FIG. 6F, the FN–1 pulse is applied via OR gate 665 to the accumulator 664 in order to reset it to zero. The FN–2 pulse is used to request a "fetch" from the result memory 631. When the fetch is complete, the clock will branch to step FN–5. On FIG. 6D, lower right, the FN–5 pulse is applied to line 666 in order to start the computation unit 667 entitled "raise to $N^{th}$ power." This operation will be described later. When the operation is completed, the clock will branch to stage FN–8 via gate 669. The FN–8 pulse is applied to gate 670, FIG. 6F (upper), in order to gate the result register 668 to the accumulator 664. The FN–9 pulse is applied to gate 672 (FIG. 6D) from comparison circuit 661 in order to test the MAR counter 630. If the value in counter 630 is not equal to the value in MAX address register 663, the clock will branch to stage FN–11. FN–11 increments the MAR counter 630 and branches to FN–2. If the value in counter 630 is equal to the MAX address value, the clock will continue to state FN–10. The FN–10 pulse is used to reset flip-flop 674 (FIG. 4B) to "0" via OR 527.

Reference should next be made on the timing chart to the NP clock. On FIG. 6F top, the NP–1 pulse is applied to gate 676 in order to gate the "data" field of the MDR 641 of the result memory 631 to the $N^{th}$ power register 678. The same "-data" field is also gated into the result register 668. The NP–1 pulse is also applied to $N^{th}$ power counter 680 on the top of FIG. 6D in order to reset it to "1."

Figure 6F:
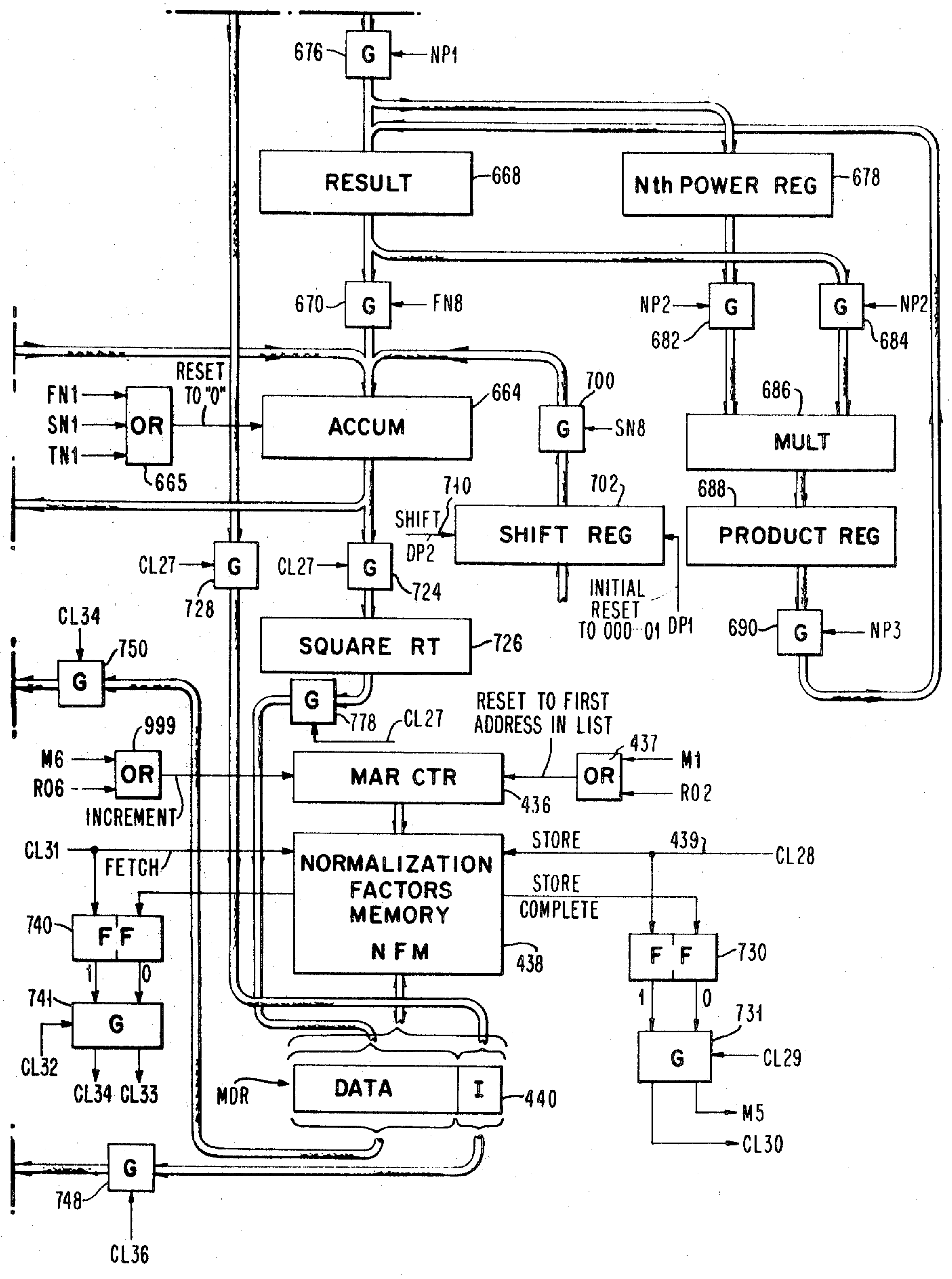

The NP–2 pulse is applied to gates 682 and 684 FIG. 6F in order to gate $N^{th}$ power register 678 to the multiplier 686 as well as gating the result register 668 to the multiplier 686.

The NP–3 pulse is applied to gate 690 in order to gate the product register 688 to the result register 668. The NP–3 pulse is also applied to $N^{th}$ power counter 680, top of FIG. 6D, in order to increment it.

The NP–4 pulse is applied to gate 692 in order to test $N^{th}$ power counter 680 in cooperation with comparison circuit 695. If the value in counter 680 is not equal to the value in register 694, the clock will branch back to stage NP–2. If the value in counter 680 is equal to the value in $N^{th}$ power register 694, the clock will advance to stage NP–5. Pulse NP–5 resets flip-flop 662 (lower right FIG. 6D) to its "0" state, indicating termination of the $N^{th}$ power computation.

Attention should next be directed to that portion of the timing chart relating to the SN microprogram "second nonlinear operation on cross correlation," which clock is abbreviated SN. Referring to FIG. 6C, the SN–1 pulse is applied to the MAR counter 630 (via OR 629, line 627) in order to reset it to the first address in the list. On FIG. 6F (upper center), the SN–1 pulse is passed via OR 665 to reset accumulator 664 to "0." The SN–2 pulse is used to request a "fetch" from the result memory 631. When this fetch is completed, the clock will branch to stage SN–5. On FIG. 6D (upper right), the SN–5 pulse is applied to line 696 in order to start the operation entitled "raise '2' to the data power." This operation is abbreviated "DP." The flip-flop 698 is also set to its "1" state. When the DP computation is completed, the clock will branch to stage SN–8. On FIG. 6F (center), the SN–8 pulse is applied to gate 700 in order to gate the contents of the shift register 702 to the accumulator 664. On FIG. 6D (center), the SN–9 pulse is applied to gate 704 in order to test the MAR counter 630, as described above. If this counter is not equal to the value in the MAX address register 663, the clock will branch to stage SN–11. SN–11 increments the MAR counter 630 and branches to SN–2. If the value in the MAR counter 630 is equal to the MAX address value, the clock will advance to stage sn–10. Pulse SN–10 is used to reset flip-flop 698 to its "0" state.

Reference should next be made on the timing chart to the microprogram entitled "raise '2' to the data power." This clock is abbreviated "DP."

On FIGS. 6C and 6D, the DP–1 pulse is applied to gate 706 in order to gate the "data" field of the MDR 641 of the result memory 631 to counter 708, FIG. 6D lower. The DP–1 pulse is also used to reset the shift register 702 (FIG. 6F) to all zero's except the low order which is set to a "1." On FIG. 6F, the DP–2 pulse is applied to line 710 in order to shift the shift register 702 one position to the left. On FIG. 6D, the DP–2 pulse is used to decrement "2" to the Data Power Counter 708. The DP–3 pulse is applied to gate 712 in order to test the decoder 714, lower FIG. 6D. If counter 708 is not on "0," the clock will revert back to stage DP–2. If counter 708 is on "0," the clock will advance to stage DP–4. The pulse DP–4 is used to reset flip-flop 698 (above) to its "0" state.

Reference should next be made to the microprogram entitled "third nonlinear operation on cross correlation." This operation is abbreviated "TN." On FIG. 6C, the TN–1 pulse is used to reset the MAR counter 630 to the first address in the list. Pulse TN–1 is also used to reset the accumulator 664 (FIG. 6F) to "0." On FIG. 6E, the TN–1 pulse is used to reset MAX hold register 716 to "0." On FIG. 6C, the TN–2 pulse is used to request a "fetch" from the result memory 631. When this "fetch" is complete, the clock will branch to stage TN–5. On FIG. 6E, the TN–5 pulse is applied to gates 718 in order to test the "data" field of MAX hold register 716, by means of compare circuit 717. If the "data" field of the MDR 641 of the result memory 631 is greater than the "data" field of the MAX hold register 716, the clock will advance to stage TN–6. Pulse TN–6 gates the MDR 641 of the result memory 631 into maximum hold register 01 via gate 720, FIG. 6C. If the "data" field of MAX hold register 716 is equal to or greater than the "data" field, of the MDR 641 of the result memory, the clock will branch to stage TN–7. On FIG. 6C (center), the TN–6 pulse is applied to gate 720 which gates the entire contents of the MDR 641 of the result memory to the MAX hold register 716. On FIG. 6D (center) the TN–7 pulse is applied to gate 722 in order to test the MAR counter 630. If the MAR counter 630 value is not equal to the value in the MAX address register 663, the TN clock will continue to stage TN–8. If the MAR counter value 630 is equal to the MAX address value, the TN clock will branch to stage TN–9. Pulse TN–8 is used to increment MAR counter 630 and from this point the clock reverts back to stage TN–2. Pulse TN–9 gates the value from the data field in the MDR 641 of the Result Memory held in the MAX Hold Register 01 716 to Accumulator 664. Pulse TN–10 is passed via OR 527 to reset flip-flop 674 (FIG. 4B) to its "0" state.

Referring again to FIG. 4B, the completion of the desired nonlinear operation on the cross correlation will, via flip-flop 674, gate 675 and pulse CL–23, cause the CL clock to continue on to stage CL–25. The CL–25 pulse is directed through single shot 677 to AND circuit 530 to produce pulse stage CL–26 on line 431 by means of single shot 435. At this point reference should be made to the portion of the CL clock entitled "normalization factor calculation and storage for initialization" only. Referring to FIG. 6F, the CL–26 pulse is used for delay only and leads to pulse CL–27. The CL–27 pulse is applied to gate 724 in order to gate the accumulator 664 to the square root device 726. It will be noted that the output of the square root device 726 extends to the "data" field of the MDR 440 of the NFM memory 438 via gate 778 to which the CL–27 pulse is also applied. The CL–27 pulse is also applied to gate 728 in order to gate the contents of counter 502 (FIG. 6A) to the right-hand field of the MDR 440 of the NFM memory. On FIG. 6, the CL–28 pulse is used to request a "store" operation by the NFM memory 438 via line 439. When this is complete, at stage CL–29 via flip-flop 730 and gate 731, the clock branches to stage M–5. Reference should next be made to the "initialization master clock" on the chart, which is abbreviated "M." Referring to FIG. 6A, the M–5 pulse is applied to gate 732 in order to test the counter 502, by means of the comparison circuit 431. If the counter 502 is not equal to the value in MAX number of references unit 442, the M clock continues to stage M–6. Pulse M–6 to OR 443 increments counter 502 and MAR counter 436 and returns the clock to stage M–2. If counter 502 is equal to the value in MAX number of references unit 442, the pulse on line 734 is communicated to FIG. 4B to set flip-flop 500 to its "0" state, to mark the termination of the initialization procedure. The CL–31 pulse is also used to request a "fetch" from the NFM memory 438. At the same time this pulse sets the NFM fetch flip-flop 740 to its "1" state. When this fetch is complete, the clock will branch to stage CL–34 via CL–32 and gate 741. The clock pulse CL–34 is applied to gate 742 in FIG. 6E in order to gate the accumulator 664 (FIG. 6F) to the divide circuit 746 (FIG. 6E) as a dividend. The CL–34 pulse is also applied to gate 750 in order to gate the "data" field of the MDR 440 of the NFM memory 438 to the divide circuit 746 as a divisor. The quotient will appear in the register 752. The CL–35 pulse is applied to gate 754 in order to test the output of the compare unit 735 between the quotient register 752 and the "-data" field of the MAX hold register 736. If the quotient is greater than the data field, the clock will advance to stage CL–36. If the data field is greater than or equal to the quotient, the clock will branch to stage RO–5. The "RO" clock is an abbreviation for the "regular operation clock" which has not been described. When this clock is described, it will be clear why the branch is made from stage CL–35 back to stage RO–5. The CL–36 pulse is applied to gate 756 in order to gate the quotient register 752 to the "data" field of the MAX hold register 2, 736. The CL–36 pulse is also applied to gate 758 in order to gate the two left-hand fields for incremental shift information of MAX hold register 2, 716 to the corresponding left-hand fields of MAX hold register 2, 736. This last operation is done only if the third nonlinear operation is used. The CL–36 pulse is also applied to gate 748 FIG. 6F in order to gate the right-hand "identity" field of the MDR 440 of the NFM memory to the corresponding right-hand field of MAX hold register 2, 736. From stage CL–36 the clock branches to stage RO–5.

Reference should next be made on the timing chart to the "regular operation clock" which is abbreviated "RO."

This microprogram is started when the machine is in its regular operation mode. In other words, when it is recognizing patterns. On FIG. 6A, the RO–1 pulse is used to set the data counter 760 to "1." On FIG. 6F, the RO–2 pulse is coupled via OR 437 to reset the MAR counter 436 of the NFM memory 438 to the first address in the list. On FIG. 6A, the RO–2 pulse is passed via OR 501 to set the counter 502 to "1." On FIG. 4A, the RO–2 pulse is applied to wire 504 in order to start loading the memory UM–1 529 from the data acquisition source. When this loading operation is completed, the clock branches to stage CL–1. The CL–clock will now proceed as described before until the stage CL–35 or CL–36 is reached. From either of these two steps, the clock can branch back to stage RO–5. On FIG. 6E, the RO–5 pulse is applied to gate 762 which gates the contents of register 736 to a standard output memory employed for input to decision analysis equipment. The RO–5 pulse is applied to gate 764 (FIG. 6A) in order to test the value in counter 502. If the value in counter 502 is not equal to the value in MAX number of references register 442, the clock will advance to stage RO–6. If the value counter 502 is equal to the MAX number of references value, the clock will branch to stage RO–7. Pulse RO–6 is applied through OR 443 and is used to increment counter 502. Pulse RO–6 is also applied in FIG. 6F to increment NFM MAR counter 436 via OR 999, so that it will be synchronized with the reference memory. On FIG. 6A, the RO–7 pulse is applied to gate 766 in order to test the compare unit 765 between data counter 760 and the MAX data register 767. If the output is unequal, the clock will advance to stage RO–8. If the output is "equal," it is the end of the program. Pulse RO–8 increments the data counter 760 and returns the clock to state RO–2.

Figure 7C:
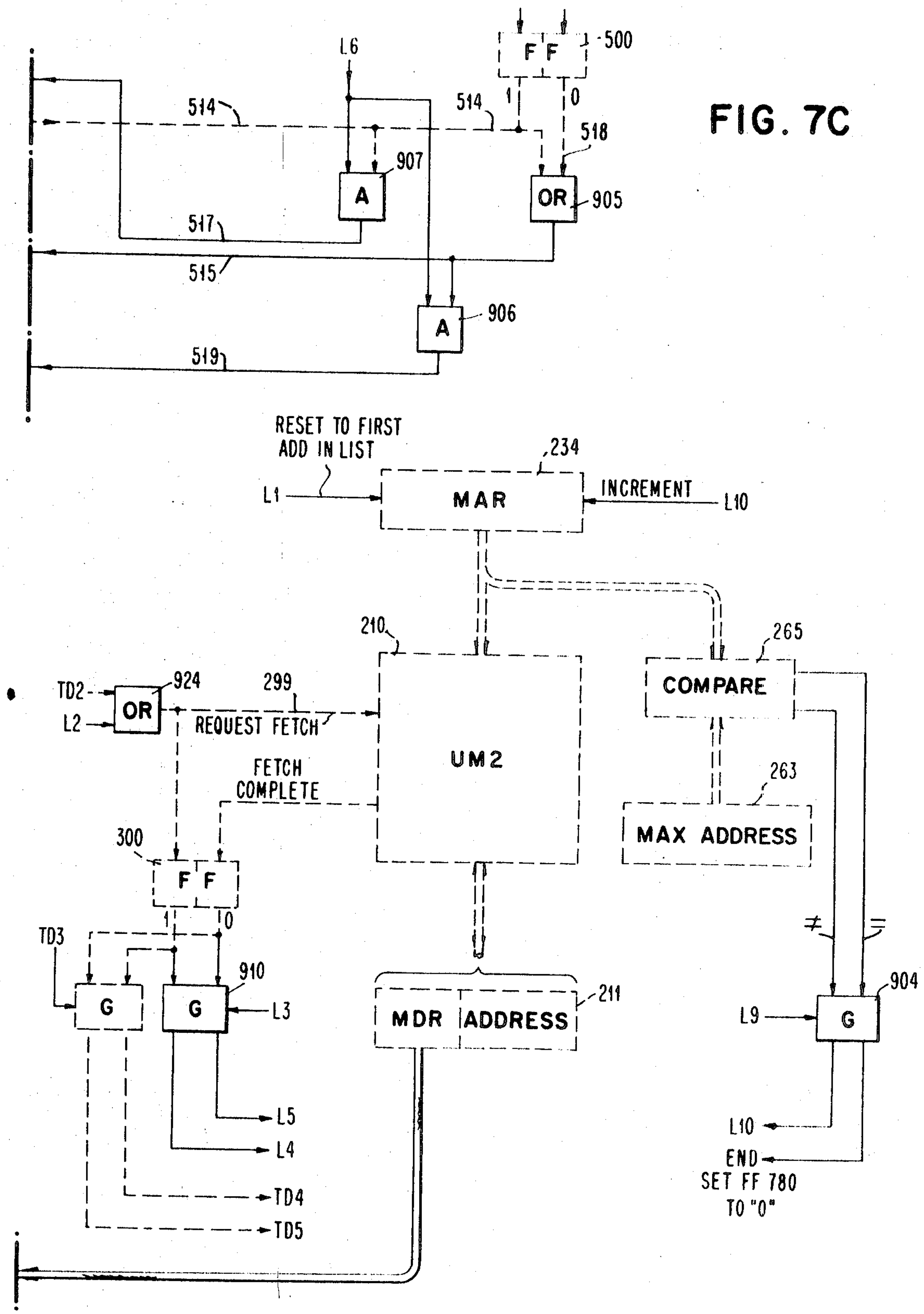

FIGS. 7A–7C show the connections between the memory UM2 210 shown in FIG. 5 which contains the memory information translated from memory UM–1 529 as described in connection with FIGS. 5A–5D. The operations performed by the collocation of functional elements of the data processor shown in FIGS. 7A–7C comprise the loading of data from UM–2 memory 210 into either of the reference memories, shown in phantom 606, 608 and 610 or the Input Signal Memory ISM 400. In operation of the system for recognition, only the ISM 400 would receive data for identification in comparison with the reference data previously stored in the reference memories.

Those portions of FIGS. 7A–7C shown in solid lines are not shown in FIGS. 4A–4B, 5A–5D or 6A–6F. Those shown in phantom are shown in the other drawings. This is done to indicate that the elements shown in solid lines in FIGS. 7A–7C were omitted from the preceding drawings for convenience of illustration.

Clock pulse CL–16 causes the load reference memory and/or input signal clock to operate. Clock pulse L–1 resets the memory address register 234 of utility memory UM–2 210 to the first address on its list as shown in FIG. 7C. Pulse L–1 also resets the memory address register 612 (FIG. 7B) of the reference memory by means of AND gate 914 if flip-flop 500 is in its "1" state via line 514 and the memory address register 632 of ISM 400 via AND gate 913 from OR and line 515 as shown in FIGS. 7B and C. Loading clock pulse L–2 (FIG. 7C, left) is passed by OR gate 924 on line 299 to request a fetch from utility memory 2 UM–2 210. The microprogram branches to stage L–5 when the fetch operation has been completed. Pulse L–5 gates the MDR 211 of UM–2 210 via gate 909 controlled by AND 908 and line 514 to the MDR 614 of the reference memory and (via gate 911, AND 912, line 515 and OR 905) to the MDR 401 of the ISM memory 400 if the flip-flop 500 is in its "1" condition. However, if the flip-flop 500 is in its "0" condition, then it gates the MDR 211 of UM–2 210 to the MDR 401 of ISM memory 400 only, without gating to the reference memory MDR 614. Step L–6 creates a pulse which requests a store operation by the reference memory section pointed to by the counter 502 and the decoder 616 if the flip-flop 500 is on "1." Otherwise, it requests a store operation by the ISM memory 400 if the flip-flop 500 is on "0." Upon completion of those store operations, the microprogram L branches to step L–9. Pulse L–9 causes the memory address register 234 of utility memory 2 UM–2

210 to be tested to determine whether the value stored therein is equal to the value stored in MAX address register 263. A comparison is performed by compare circuit 265. If equality exists, then gate 904 ends the microprogram and sets flip-flop 780 on FIG. 4B to "0" indicating the end of the load memory microprogram. If on the other hand, gate 904 measures inequality then the microprogram is branched to stage L-10. Then, the memory address register 234 of UM-2 210 is incremented. Further, the memory address register 614 of the reference memory and the memory address register 632 of the ISM memory are both incremented if flip-flop 500 has a value of "1," via AND's 925 and 926, and line 514 or line 515 and OR 905. Alternatively, if the flip-flop 500 has a value of "0," then the ISM memory MAR 632 is incremented via line 515, OR 905, and line 518. Flip-flop 500 provides an input to either side of OR gate 905 which is connected to AND gate 906 in combination with output from stage L-6, in order to provide a request store operation at any time when L-6 occurs for the ISM 400. Flip-flop 901 measures the completion of the store operation on the ISM. AND gate 922 will operate to produce stage L-9 via gate 923 as will OR gate 921 produce stage L-7 via gate 923 when pulse L-7 occurs. OR gate 921 shows that one of the "store" flip-flops 901 or 920 of the ISM or the reference memory is in its "1" state. AND 922 shows that both flip-flops 901 and 920 show completion of the store operation in their "0" states. AND gate 907 is connected to provide, during stage L-6 and in the "1" condition of flip-flop 500, an output which passes the request store controls via AND gates 915, 916 and 917 of the reference memory and then to select the reference memory indicated by the counter 502 and the decoder 616. Upon completion of the request for storage, of course, the flip-flop 920 will indicate an output of "0." Reference storage will occur only when flip-flop 500 is in its "1" condition and in that case of course both the reference memory and the which memory 400 will be caused to store information. AND gate 908 requires input from a pulse L-5 as well as from line 514 indicating a "1" value of flip-flop 500. The output of AND gate 908 passes to gate 909 which couples the memory data register data value in MDR 211 into the memory data register 614 of the reference memory. Pulse L-5 is also connected to AND gate 912 which is operated by line 518 or line 514 by means of OR gate 905 and line 515 to control gate 911 which couples the data values in the MDR 211 of UM2 210 into the memory data register 401 of the ISM memory 400. AND gate 913 requires inputs from stage L-1 as well as from lines 514 or 518 via OR 905 and line 515 to reset the memory address register 632 to the first address on the list. AND gate 914 is connected to line 514 from flip-flop 500's "1" position to reset the memory address register 612 of the reference memory to the first address on the list. AND gate 925 is connected to line 514 and to receive pulse L-10 to increment the memory address of the reference 612 and AND gate 926 is connected to L-10 pulse input as well as to the combined outputs of flip-flop 500 via OR 905 to provide an increment to the memory address register 632 of the ISM memory 400.

FIG. 8 shows the logic box indicated in FIG. 6B in greater detail in accordance with one mode of operation.

The value Z sum is applied to cable 968, and the value $\theta$ sum is applied to cable 969. Both values are compared to the value $n+1$ held in $n+1$ register 971. Compare Z sum unit 972 provides an input to OR 973 if the sum is greater than or equal to $n+1$. Compare $\theta$ Sum unit 974 provides a pulse to gate 975 if $\theta$ Sum exceeds $n$. Compare unit 976 compares the value of Z sum with the value zero from unit 978 and provides an output to OR 973 if the value of Z sum is less than zero. Compare unit 977 compares the value of $\theta$ sum with the value of zero in unit 978 and provides a control input pulse to gate 979 if the value of $\theta$ sum is less than zero. Subtractor 991 subtracts $n+1$ from unit 971 from $\theta$ sum from line 969. Adder 990 adds $\theta$ sum to $(n+1)$ from those sources. Gates 975 and 979 connect the subtractor 991 and the adder 990 to gate 636 in FIG. 6B via line 970 along with lines Z sum and $\theta$ sum. The rationale of this operation is described above. OR 973 is connected to Inverter I 980 and flip-flop 634 so that the flip-flop will be in its "1" state when no pulse is applied via OR 973 and in its "0" state otherwise.

FIG. 9 shows the Logic Box II referred to above for use in Logic Unit 638.

Z Sum is compared in Comparator 782 with $n+1$ from register 981. If Z Sum equals or exceeds $(n+1)$ the output is applied to OR 988 and thence to set flip-flop 634 to its "0" state. Z Sum is also compared in Comparator 985 with zero from Register 984. If Z is less than zero, an output is applied to OR 988.

$\theta$ Sum is also compared with $n+1$ from register 981 and if greater than or equal to $n+1$, applies a pulse to OR 988. Comparator 986 is connected to register 984 and $\theta$ sum line 969 and provides a pulse, when $\theta$ sum is less than zero, to OR 988. If OR 988 provides no output, inverter 987 provides a "1" state control input to flip-flop 634. Lines 968 and 969 connect to line 970 directly. It is believed that the above description of the schematic diagrams shown in FIGS. 4, 5, 6, and 7 clearly explains the operation of all of the significant components of the present system. The specific operations of each functional operation have thus been described and the result of the function clearly explained. To further illustrate the operation of the system, the following TIMING SEQUENCE TABLE is included which clearly specifies the particular operation performed by each of the clock steps.

TABLE II

Timing Sequence Table
Initialization Master Clock Abbreviated "M"

| | |
|---|---|
| M-1 | Set Reference Memory Counter to "1"<br>Set NFM MAR Counter to "1"<br>go to M-2 |
| M-2 | Start Load UM1 from data acquisition source<br>Set flip-flop **506** to "1"<br>go to M-3 |
| M-3 | Test for completion (Test flip-flop **506**)<br>If on "1" go to M-4<br>If on "0" go to CL-1 |
| M-4 | Delay<br>go to M-3 |
| M-5 | Test compare unit between Reference Memory Counter<br>and MAX number of references<br>If = go to Initialization finished<br>(FIG. 4B) set flip-flop **500** to "0"<br>Throw switch to regular operation path<br>If ≠ go to M-6 |
| M-6 | Increment Reference Memory Counter<br>Increment NFM MAR Counter<br>go to M-2 |

Regular Operation Clock Abbreviated "RO"

Use additional counter to count number of input data to be recognized.

| | |
|---|---|
| RO-1 | Set "Data" counter to "1"<br>go to RO-2 |
| RO-2 | Set MAR counter of NFM to first address in list<br>Set Reference Memory counter to 1<br>Start load UM1 from data acquisition source<br>Set flip-flop **506** to "1"<br>go to RO-3 |
| RO-3 | Test for completion (test flip-flop **506**)<br>if on "1" go to RO-4<br>if on "0" go to CL-1 |
| RO-4 | Delay<br>go to RO-3 |
| RO-5 | (From CL-35 or CL-36)<br>Test compare unit between Reference Memory Counter and Maximum number of references<br>if ≠ go to RO-6<br>if = go to RO-7 |
| RO-6 | Increment Reference Memory Counter<br>Increment NFM MAR Counter<br>go to CL-19 |
| RO-7 | Test compare unit between Data Counter and Maximum Data Register<br>if ≠ go to RO-8<br>if = go to END |
| RO-8 | Increment Data Counter<br>go to RO-2 |

| | |
|---|---|
| CL-1 | Start computing center of gravity<br>Starts CG clock<br>Set flip-flop 100 to "1"<br>go to CL-2 |

"CG" Clock—"Center of Gravity" Clock

| | |
|---|---|
| CG-1 | Reset Accumulator Adders<br>Reset UM1-MAR Counter to first address in list<br>go to CG-2 |
| CG-2 | Request fetch from UM1<br>Set flip-flop 200 to "1"<br>go to CG-3 |
| CG-3 | Test for completion of above (test flip-flop 200)<br>If on "1" go to CG-4<br>If on "0" go to CG-5 |
| CG-4 | Delay<br>go to CG-3 |
| CG-5 | Gate $X_i$ and $Y_j$ of MDR of UM1 to Multipliers<br>Gate Data of MDR of UM1 to Multipliers and accumulator adders<br>go to CG-6 |
| CG-6 | Test MAR counter of UM1<br>If = MAX address go to CG-8<br>If≠MAX address go to CG-7 |
| CG-7 | Increment MAR counter of UM1<br>go to CG-2 |
| CG-8 | Gate accumulator adders to Dividers<br>go to CG-9 |

| | |
|---|---|
| CL-2 | Test for completion of above (Test flip-flop 100)<br>If on "0" go to CL-4<br>If on "1" go to CL-3 |
| CL-3 | Delay only<br>go to CL-2 |
| CL-4 | Starts "S" ("Subtract") Clock for computing "center data"<br>Sets flip-flop 116 to "1"<br>go to CL-5 |

| | |
|---|---|
| CG-9 | Gate $\overline{X}$ and $\overline{Y}$ and $n/2$ register to adders. Result of addition in Registers $\overline{X}+n/2$ and $\overline{Y}+n/2$<br>go to CG-10 |
| CG-10 | Operation complete (set flip-flop 100 to "0") |

"S" Clock—Subtract The Center of Gravity Plus $n/2$ From Every DAta Location Index—Store Data in Memory With Coordinate Origin ($n/2$, $n/2$) Coinciding With Center of Gravity

| | |
|---|---|
| S-1 | Reset UM1-MAR Counter to first address in list<br>go to S-2 |
| S-2 | Request fetch from UM1<br>Set flip-flop 200 to "1"<br>go to S-3 |
| S-3 | Test for completion of above<br>(test flip-flop 200)<br>if on "1" go to S-4<br>if on "0" go to S-5 |
| S-4 | Delay<br>go to S-3 |
| S-5 | Gate $X_i$ of MDR of UM1 to subtract<br>Gate $\overline{X}+n/2$ to subtract<br>Gate $Y_j$ of MDR of UM1 to subtract<br>Gate $\overline{Y}+n/2$ to subtract<br>go to S-6 |
| S-6 | Gate "Hold-X" to $X_i$ of MDR of UM1<br>Gate "Hold-Y" to $Y_j$ of MDR of UM1<br>go to S-7 |
| S-7 | Request store access of UM1<br>Set flip-flop 772 to "1"<br>go to S-8 |
| S-8 | Is above complete?<br>(test flip-flop 772)<br>if on "1" go to S-9<br>if on "0" go to S-10 |
| S-9 | Delay<br>go to S-8 |
| S-10 | Test MAR Counter of UM1<br>if = MAX address go to S-12<br>if≠MAX address go to S-11 |
| S-11 | Increment MAR Counter of UM1<br>go to S-2 |
| S-12 | Operation complete<br>(set flip-flop 116 to "0") |

| | |
|---|---|
| CL-5 | Test for completion of above<br>(test flip-flop 116)<br>if on "1" go to CL-6<br>if on "0" go to CL-13 |
| CL-6 | Delay only<br>go to CL-5<br>(CL-7 to CL-12 are ommitted.) |
| CL-13 | Start computing for "Translator" (TD)<br>Set flip-flop 122 to "1"<br>go to CL-14 |

Transfer Data to a new table in memory according to a stored address correspondence (abbreviated "TD") Translator Started by CL-13

| | |
|---|---|
| TD-1 | Reset MAR counter of UM2 to first address in list<br>go to TD-2 |
| TD-2 | Request fetch of UM2<br>Set flip-flop 300 to "1"<br>go to TD-3 |
| TD-3 | Is above complete?<br>(test flip-flop 300)<br>if on "1" go to TD-4<br>if on "0" go to TD-5 |
| TD-4 | Delay<br>go to TD-3 |
| TD-5 | Gate address field of MDR of UM2 to MAR of UM1<br>go to TD-6 |
| TD-6 | Request fetch of UM1<br>Set flip-flop 200 to "1"<br>go to TD-7 |
| TD-7 | Is above complete?<br>(test flip-flop 200)<br>if on "1" go to TD-8<br>if on "0" go to TD-9 |
| TD-8 | Delay<br>go to TD-7 |
| TD-9 | Gate Data field of MDR of UM1 to Data field or MDR of UM2<br>go to TD-10 |
| TD-10 | Request store of UM2<br>Set flip-flop 770 to "1"<br>go to TD-11 |
| TD-11 | Is above complete?<br>(test flip-flop 770)<br>if on "1" go to TD-12<br>if on "0" go to TD-13 |
| TD-12 | Delay<br>go to TD-11 |
| TD-13 | Test MAR counter of UM2<br>if = MAX address go to TD-15<br>if≠MAX address go to TD-14 |
| TD-14 | Increment MAR counter of UM2<br>go to TD-2 |
| TD-15 | Operation complete<br>set flip-flop 122 to "0" |

| | |
|---|---|
| Cl-14 | Test for completion of above<br>(test flip-flop 122)<br>if on "1" go to CL-15<br>if on "0" g0 to CL-16 |
| CL-15 | Delay only<br>go to CL-14 |
| CL-16 | Start computing for "Load Reference" (L)<br>Set flip-flop 780 to "1"<br>go to CL-17 |

Load Reference Memory and/or Input Signal—Omit Address field

Abbreviate L"CL-

| | |
|---|---|
| L-1 | Reset MAR counter of UM2 to first address in list<br>Reset MAR counter of Reference Memory to first address in list<br>Reset MAR counter of ISM Memory to first address in list<br>go to L-2 |
| L-2 | Request fetch from UM2<br>Set omitted.) 300 to "1"<br>go to L-3 |
| L-3 | Is above complete?<br>(Test flip-flop 300)<br>If on "1" go to L-4<br>If on "0" go to L-5 |
| L-4 | Delay<br>go to L-3 |

| | |
|---|---|
| L-5 | Gate MDR of UM2 to MDR of Reference Memory and to MDR of ISM Memory if flip-flop **500** is on "1"<br>Gate MDR of UM2 to MDR of ISM Memory only if flip-flop **500** is on "0"<br>go to L-6 |
| L-6 | Request store of Reference Memory "pointed to" by counter **502** and of ISM Memory and set flip-flop **901** and **920** to "1" if flip-flop **500** is on "1"<br>Request store of ISM Memory and set flip-flop **901** to "1" only if flip-flop **500** is on "0"<br>go to L-7 |
| L-7 | Is above complete?<br>(Test flip-flop **920** and flip-flop **901**<br>If either is on "1," go to L-8<br>If both are on "0," go to L-9 |
| L-8 | Delay<br>go to L-7 |
| L-9 | Is MAR counter of UM2 equal to MAX address?<br>If no, go to L-10<br>If yes, operation complete set flip-flop **780** to "0" |
| L-10 | Increment MAR counter of UM2<br>Increment MAR counter of Reference Memory and MAR counter of ISM Memory if flip-flop **500** is on "1"<br>Increment MAR counter of ISM Memory if flip-flop **500** is on "0"<br>go to L-2 |

| | |
|---|---|
| CL-17 | Test for completion of above<br>(test flip-flop **780**)<br>if on "1" go to CL-18<br>if on "0" go to CL-19 |
| CL-18 | Delay<br>go to CL-17 |
| CL-19 | Start "Cross Correlate" computation<br>Set flip-flop **658** to "1"<br>go to CL-20 |

Cross Correlate Clock—abbreviated "CC"

| | |
|---|---|
| | Started by CL-19 |
| CC-1 | Reset MAR of RESULT MEMORY to first address in list<br>Reset Accumulator **652**<br>go to CC-2 |
| CC-2 | Request fetch from RESULT MEMORY<br>Set flip-flop **633** to "1"<br>go to CC-3 |
| CC-3 | Is above complete?<br>(test flip-flop **633**)<br>if "1" go to CC-4<br>if "0" go to CC-5 |
| CC-4 | Delay only<br>go to CC-3 |
| CC-5 | Reset ISM-MAR to first address in list<br>go to CC-6 |
| CC-6 | Request fetch from ISM<br>Set flip-flop **774** to "1"<br>go to CC-7 |
| CC-7 | Is above complete?<br>(test flip-flop **774**)<br>if on "1" go to CC-8<br>if on "0" go to CC-9 |
| CC-8 | Delay only<br>go to CC-7 |
| CC-9 | Test Logic flip-flop **634**<br>if on "0" go to CC-14<br>if on "1" go to CC-23 |
| CC-10 | Request fetch from REFERENCE MEMORY<br>Set flip-flop **776** to "1"<br>go to CC-11 |
| CC-11 | Is above complete?<br>(test flip-flop **776**)<br>if on "1" go to CC-12<br>if on "0" go to CC-13 |
| CC-12 | Delay<br>go to CC-11 |
| CC-13 | Gate MDR of REFERENCE MEMORY to Multiplier<br>Gate Data field of MDR of ISM to Multiplier<br>go to CC-25 |
| CC-14 | Test compare unit between MAR Counter of ISM and MAX Address<br>if = go to CC-16<br>if≠go to CC-15 |
| CC-15 | Increment MAR Counter of ISM<br>go to CC-6 |
| CC-16 | Gate Accumulator to Data field OF MDR of RESULT MEMORY<br>go to CC-17 |
| CC-17 | Request store of RESULT MEMORY<br>(set flip-flop **656** to "1")<br>go to CC-18 |
| CC-18 | Is above complete?<br>(test flip-flop **656**)<br>if on "1" go to CC-19<br>if on "1 " go to CC-21 |
| CC-19 | Delay<br>go to CC-18 |
| CC-20 | Is omitted |
| CC-21 | Test compare unit between MAR Counter of RESULT MEMORY and MAX address<br>if≠go to CC-22<br>if = go to CC-24 |
| CC-22 | Increment MAR Counter of RESULT MEMORY<br>go to CC-2 |
| CC-23 | Gate Logic Output to MAR of REFERENCE MEMORY<br>go to CC-10 |
| CC-24 | Operation Complete<br>Set flip-flop **658** to "0" |
| CC-25 | Gate output of Multiplier to Accumulator<br>go to CC-14 |

| | |
|---|---|
| CL-20 | Test for completion of above<br>(test flip-flop **658**)<br>if on "1" go to CL-21<br>if on "0" go to CL-22 |
| CL-21 | Delay<br>go to CL-20 |
| CL-22 | Start "Desired Nonlinear Operation on Cross Correlation"<br>go to CL-23 |

First Nonlinear Operation on Cross Correlation Abbreviate "FN"—Raise to Nth power

| | |
|---|---|
| | Started by CL-22 |
| FN-1 | Reset MAR Counter of RESULT MEMORY to first address in list<br>Reset Accumulator<br>go to FN-2 |
| FN-2 | Request fetch from RESULT MEMORY<br>Set flip-flop **633** to "1"<br>go to FN-3 |
| FN-3 | Is above complete?<br>(test flip-flop **633**)<br>if "1" go to FN-4<br>if "0" go to FN-5 |
| FN-4 | Delay<br>go to FN-3 |
| FN-5 | Start NP clock<br>Set flip-flop **662** to "1"<br>go to FN-6 |

Raise to Nth power clock—abbreviate "NP"

| | |
|---|---|
| | Started by FN-5 |
| NP-1 | Gate Data field of MDR of Result Memory to Nth power register and to Result register<br>Set Nth power counter to "1"<br>go to NP-2 |
| NP-2 | Gate Nth power register to Multiplier<br>Gate Result register to Multiplier<br>go to NP-3 |
| NP-3 | Gate Product register to Result Register<br>Increment Nth power counter<br>go to NP-4 |
| NP-4 | Test Compare Unit between Nth power counter and Nth power<br>If≠go to NP-2<br>If = go to NP-5 |
| NP-5 | Operation Complete<br>set flip-flop **662** to "0" |

| | |
|---|---|
| FN-6 | Is above complete?<br>(test flip-flop 662)<br>if on "1" go to FN-7<br>if on "0" go to FN-8 |
| FN-7 | Delay<br>go to FN-6 |
| FN-8 | Gate Result to Accumulator<br>go to FN-9 |
| FN-9 Test compare unit between MAR Counter of Result | Memory and Max Address<br>if≠go to FN-11<br>if = go to FN-10 |
| FN-10 | Operation Complete<br>Reset flip-flop 674 to "0" |
| FN-11 | Increment MAR Counter of Result Memory<br>go to FN-2 |

Second Nonlinear Operation on Cross Correlation—Abbreviated "SN"—Raise 2 to Cross Correlation Power

| | |
|---|---|
| | Started by CL-22 |
| SN-1 | Reset MAR Counter of RESULT MEMORY to first address<br>in list<br>Reset Accumulator<br>go to SN-2 |
| SN-2 | Request fetch from RESULT MEMORY<br>Set flip-flop 633 to "1"<br>go to SN-3 |
| SN-3 | Is above complete?<br>(test flip-flop 633)<br>if "1" go to SN-4<br>if "0" go to SN-5 |
| SN-4 | Delay<br>go to SN-3 |
| SN-5 | Start DP clock<br>Set flip-flop 698 to "1"<br>go to SN-6 |

Raise "2" to the "Data Power" clock—abbreviated "DP"

| | |
|---|---|
| | Started by SN-5 |
| DP-1 | Gate Data field of MDR of Result Memory to "2" to the "Data Power" Counter<br>Set shift register to "1" in low order position and "0" in all other positions<br>go to DP-2 |
| DP-2 | Shift Shift Register to the left<br>Decrement "2" to the Date Power Counter<br>go to DP-3 |
| DP-3 | Test "2" to the Data Power Counter<br>if not "0" go to DP-2<br>if "0" go to DP-4 |
| DP-4 | Operation complete<br>(reset flip-flop 698 to "0") |

| | |
|---|---|
| SN-6 | Is above complete?<br>(test flip-flop 698)<br>if on "1" go to SN-7<br>if on "0" go to SN-8 |
| SN-7 | Delay<br>go to SN-6 |
| SN-8 | Gate Shift Register to Accumulator<br>go to SN-9 |
| SN-9 | Test compare unit between MAR Counter of RESULT<br>MEMORY AND Max address<br>if≠go to SN-11<br>if = go to SN-10 |
| SN-10 | Operation complete<br>Reset flip-flop 674 to "0" |
| SN-11 | Increment MAR Counter of Result Memory<br>go to SN-2 |

Third NonLinear Operation on Cross Correlation—MAX of all Cross Correlation Values—Abbreviated "TN"

| | |
|---|---|
| | Started by CL-22 |
| TN-1 | Reset MAR Counter of RESULT MEMORY to first address on list<br>Reset Accumulator<br>Reset Max Hold Register 1 to "0"<br>go to TN-2 |
| TN-2 | Request fetch from RESULT MEMORY<br>Set flip-flop 633 to "1"<br>go to TN-3 |
| TN-3 | Is above complete?<br>(test flip-flop 633)<br>if on "1" go to TN-4<br>if on "0" go to TN-5 |
| TN-4 | Delay<br>go to TN-3 |
| TN-5 | Compare data field "Max Hold" 1 with Data field of MDR of RESULT MEMORY<br>if data field of memory is greater go to TN-6<br>if Max Hold is greater or equal go to TN-7 |
| TN-6 | Gate all MDR of RESULT MEMORY to Max Hold Register 1<br>go to TN-7 |
| TN-7 | Compare MAR Counter of RESULT MEMORY with MAX<br>Address<br>if = go to TN-9<br>if≠go to TN-8 |
| TN-8 | Increment MAR Counter of Result Memory<br>go to TN-2 |
| TN-9 | Gate Data Field of MDR of Result Memory held in MAX Hold Register 1 into Accumulator<br>go to TN-10 |
| TN-10 | Complete (Set flip-flop 674 to "0" state) |

| | |
|---|---|
| CL-23 | Test for completion of above<br>(test flip-flop 674)<br>if on "1" go to CL-24<br>if on "0" go to CL-25 |
| CL-24 | Delay only<br>go to CL-23 |
| CL-25 | Turns on CL-26 or CL-31 depending on setting of flip-flop 500 |

Normalization Factor Calculation And Storage for Initialization Period Only Use "Normalization Factors Memory"—Abbreviated NFM

| | |
|---|---|
| | Started by CL-25 with switch thrown for initialization |
| CL-26 | Delay only<br>go to CL-27 |
| CL-27 | Gate Sq. Rt. circuit to MDR of NFM<br>Gate Accumulator to Square Rt. circuit<br>Gate Reference Memory Counter to I field of MDR of NFM<br>go to CL-28 |
| CL-28 | Request store in NFM<br>Set flip-flop 730 to "1"<br>go to CL-29 |
| CL-29 | Is above complete?<br>(test flip-flop 730)<br>if on "1" go to CL-30<br>if on "0" go to M-5 |
| CL-30 | Delay<br>go to CL-29 |

Regular operation path started by CL-25 with switch thrown for regular operation Set Data field of Max Hold 02 to zero

| | |
|---|---|
| CL-31 | Request fetch of NFM<br>Set flip-flop 740 to "1"<br>go to CL-32 |
| CL-32 | Is above complete?<br>(test flip-flop 740)<br>if on "1" go to CL-33<br>if on "0" go to CL-34 |
| CL-33 | Delay<br>go to CL-32 |
| CL-34 | Gate data field of MDR of NFM to DIVIDE circuit as divisor<br>Gate Accumulator<br>to Divide circuit as dividend |
| CL-35 | Test compare unit between Quotient reg. and Data filed of Max Hold 02<br>if Quotient greater go to CL-36<br>if Data greater or equal to to RO-5 |
| CL-36 | Gate Quotient reg. to Data field of Max Hold 02<br>Gate $\tau_1\tau_2$ from Max Hold 01 to Max Hold 02 if Maximum NonLinear Operation is made<br>Gate I field from MDR of NFM to Max Hold 02<br>go to RO-5 |

An example of use of such clocks is shown in U.S. Pat. No. 3,350,695 of Kaufman et al., commonly assigned in FIGS. 4A and B. There is also a listing of clock sequences from Column 24 to Column 27 thereof. As such, clocking techniques, which are partially elaborated upon in FIGS. 4A and 4B hereof, are manifested by the above patent, the foregoing table, and the present application. Presumably they will be well understood by those skilled in the art.

While the invention has been particularly shown and described with reference to preferred embodiments thereof, it will be understood by those skilled in the art that the fore going and other changes in form and details may be made therein without departing from the spirit and scope of the invention.

What is claimed is:

1. A pattern recognition method for operating data handling apparatus including a first step for receiving data representing an unknown pattern, means for effectively scanning by sampling selectively at exponentially spaced points on said pattern starting at a predetermined point for producing scanned data, cross-correlating said scanned data with a plurality of known patterns, an Nth power step for raising each output value of said cross-correlating step to the Nth power, where $N=n+1$ and $n$ is an integer greater than one and summing over a range of shifted values of relative positions of the sample with respect to the reference wherein the functions of the above steps are defined by the formula as follows:

$$\sum_{K_1}\left\{\sum_{Z} S^{(1)}(Z)R_a^{(1)}(Z+K_1)\right\}^{n+1}$$

where $S^{(1)}(Z)$ is a function of sampling a sample pattern S with an exponential scan as a function of an independent variable quantity Z in which several numerical values of Z are selected as desired to sample the pattern, and where $R_a^{(1)}(Z+K_1)$ is a function resulting from an exponential scan of a reference $R_a$ which is adapted to be shifted linearly by an independent variable $K_1$ which is varied by numerical increments for the purpose of cross-correlation as values of $K_1$ are substituted into the expression and preselected and normalizing the output signal of said power step with a signal representative of $$C_1\frac{1}{\left(\sum_{K_1}\left\{\sum_{Z} R_a^{(1)}(Z)R_a^{(1)}(Z+K_1)\right\}^{n+1}\right)^{1/2}}$$

where $C_1$ is a constant.

2. A method for operating data handling apparatus for recognizing a pattern comprising:

first receiving data representing said pattern, effectively scanning by sampling selectively at exponentially spaced points on said received pattern starting at a predetermined point for producing scanned data, cross-correlating said scanned data with a plurality of known patterns, an Nth power step for raising each output value of said cross-correlating step to the Nth power, where $N=n+1$ and $n$ is an integer greater than one and for summing over a range of shifted values of relative positions of the sample reference wherein the functions of the above steps are defined by the formula as follows:

$$\sum_{K_1}\left\{\sum_{Z} S^{(1)}(Z)R_a^{(1)}(Z+K_1)\right\}^{n+1}$$

where $S^{(1)}(Z)$ is a function of sampling a sample pattern S with an exponential scan as a function of an independent variable quantity Z in which several numerical values of Z are selected as desired to sample the pattern, and where $R_a^{(1)}(Z+K_1)$ is a function resulting from an exponential scan of a reference $R_a$ which is adapted to be shifted linearly by an independent variable $K_1$ which is varied by numerical increments for the purpose of cross-correlation as values of $K_1$ are substituted into the expression and preselected and means for normalizing the output signal of said power step with a signal representative of $$C_1\frac{1}{\left(\sum_{K_1}\left\{\sum_{Z} R_a^{(1)}(Z)R_a^{(1)}(Z+K_1)\right\}^{n-1}\right)^{1/2}}$$

where $C_1$ is a constant.

3. A pattern recognition method for operating data handling apparatus including the data processing steps as follows:

a first step for receiving data representing said pattern, effectively selectively sampling by annularly scanning said centered pattern centered at a predetermined point with radii spaced exponentially for producing scanned data, cross-correlating said scanned data with a plurality of known patterns, an Nth power step for raising each output value of said cross-correlating step to the Nth power, where $N=n+1$ and $n$ is an integer greater than one and summing over a range of shifted values of relative sample with respect to the reference positions wherein the functions of the above steps are defined by the formula as follows:

$$\sum_{K_1}\sum_{\theta^{(1)}}\left\{\sum_{Z}\sum_{\theta} S^{(2)}(Z,\theta)\,R_a^{(2)}(Z+K_1,\theta+\theta^{(1)})\right\}^{n+1}$$

where $^{(2)}(Z,\theta)$ is a function of sampling a sample pattern S with an exponential scan as a function of an independent variable quantity Z and an independently varying angular quantity $\theta$, and where $R_a^{(2)}(Z+K_1, \theta+\theta^{(1)})$ is an exponential scan of a reference pattern $R_a$ with a concomitant angular scan $\theta$ and where $K_1$ represents an independent variable providing a linear shift for purposes of cross-correlation with the sample function $S^{(2)}(Z,\theta)$ and where $\theta^{(1)}$ represents an independent variable providing an angular shift for cross-correlation with the sample function $S^{(2)}(Z,\theta)$ where $K_1$ and $\theta^{(1)}$ are varied by preselected numerical increments, means for normalizing the output signal of said power means with a signal representative of $$C_1\frac{1}{\left(\sum_{K_1}\sum_{\theta^{(1)}}\left\{\sum_{Z}\sum_{\theta} R_a^{(2)}(Z,\theta)R_a^{(2)}(Z+K_1,\theta+\theta^{(1)})\right\}^{n+1}\right)^{1/2}}$$

where $C_1$ is a constant.

4. A method for recognizing a pattern comprising:

a first step for receiving data representing said pattern, determining the center of gravity of the pattern based upon the output of said first step to produce data representing a centered pattern, effectively selectively sampling by annularly scanning said centered pattern data centered at a predetermined point with radii spaced exponentially for producing scanned data, cross-correlating said scanned data with a plurality of known patterns, an Nth power step for raising each output value of said means for cross-correlating step to the Nth power, where $N=n+1$ and $n$ is an integer greater than one and for summing over a range of shifted values of relative positions of the sample with respect to the reference wherein the functions of the above steps are defined by the formula as follows:

$$\sum_{K_1}\left\{\sum_{Z} S^{(1)}(Z)R_a^{(1)}(Z+K_1)\right\}^{n+1}$$

where $S^{(1)}(Z)$ is a function of sampling a sample pattern S with an exponential scan as a function of an independent variable quantity Z in which several numerical values of Z are selected as desired to sample the pattern, and where $R_a^{(1)}(Z+K_1)$ is a function resulting from an exponential scan of a reference $R_a$ which is adapted to be shifted linearly by an independent variable $K_1$ which is varied by numerical increments for the purpose of cross-correlation as values of $K_1$ are substituted into the expression and preselected and normalizing the output signal of said power step with a signal representative of $$C_1 \frac{1}{\left(\sum_{K_1}\left\{\sum_{Z} R_a^{(1)}(Z) R_a^{(1)}(Z+K_1)\right\}^{n-1}\right)^{1/2}}$$

where $C_1$ is a constant.

5. A pattern recognition apparatus comprising:

first means for receiving data representing an unknown pattern comprising means for effectively scanning by sampling selectivity at exponentially spaced points on said pattern starting at a predetermined point for producing scanned data, means for cross-correlating said scanned data with a plurality of known patterns, Nth power means for raising each output value of said means for cross-correlating to the Nth power, where $N=n+1$ and $n$ is an integer greater than one and for summing over a range of shifted values of relative positions of the sample with respect to the reference wherein the functions of the above means are defined by the formula as follows:

$$\sum_{K_1}\left\{\sum_{Z} S^{(1)}(Z) R_a^{(1)}(Z+K_1)\right\}^{n-1}$$

where $S^{(1)}(Z)$ is a function of sampling a sample pattern S with an exponential scan as a function of an independent variable quantity Z in which several numerical values of Z are selected as desired to sample the pattern, and where $R_a^{(1)}(Z+K_1)$ is a function resulting from an exponential scan of a reference $R_a$ which is adapted to be shifted linearly by an independent variable $K_1$ which is varied by numerical increments for the purpose of cross-correlation as values of $K_1$ are substituted into the expression and preselected and means for normalizing the output signal of said power means with a signal representative of $$C_1 \frac{1}{\left(\sum_{K_1}\left\{\sum_{Z} R_a^{(1)}(Z) R_a^{(1)}(Z+K_1)\right\}^{n-1}\right)^{1/2}}$$

where $C_1$ is a constant.

6. Apparatus for recognizing a pattern comprising:

first means for receiving data representing said pattern, means for effectively scanning by sampling selectively at exponentially spaced points on said received pattern starting at a predetermined point for producing scanned data, means for cross-correlating said scanned data with a plurality of known patterns, Nth power means for raising each output value of said means for cross-correlating to the Nth power, where $N=n+1$ and $n$ is an integer greater than one and for summing over a range of shifted values of relative positions of the sample with respect to the reference wherein the functions of the above means are defined by the formula as follows:

$$\sum_{K_1}\left\{\sum_{Z} S^{(1)}(Z) R_a^{(1)}(Z+K_1)\right\}^{n-1}$$

where $S^{(1)}(Z)$ is a function of sampling a sample pattern S with an exponential scan as a function of an independent variable quantity Z in which several numerical values of Z are selected as desired to sample the pattern, and where $R_a^{(1)}(Z+K_1)$ is a function resulting from an exponential scan of a reference $R_a$ which is adapted to be shifted linearly by an independent variable $K_1$ which is varied by numerical increments for the purpose of cross-correlation as values of $K_1$ are substituted into the expression and preselected and means for normalizing the output signal of said power means with a signal representative of $$C_1 \frac{1}{\left(\sum_{K_1}\left\{\sum_{Z} R_a^{(1)}(Z) R_a^{(1)}(Z+K_1)\right\}^{n+1}\right)^{1/2}}$$

where $C_1$ is a constant.

7. A pattern recognition apparatus first means for receiving data representing said pattern, means for effectively selectively sampling by annularly scanning said centered pattern centered at a predetermined point with radii spaced exponentially for producing scanned data, means for cross-correlating said scanned data with a plurality of known patterns, Nth power, means for raising each output value of said means for cross-correlating to the Nth power, where $N=n+1$ and $n$ is an integer greater than one and summing over a range of shifted values of relative positions of the sample with respect to the reference wherein the functions of the above means are defined by the formula as follows:

$$\sum_{K_1}\sum_{\theta^{(1)}}\left\{\sum_{Z}\sum_{\theta} S^{(2)}(Z,\theta) R_a^{(2)}(Z+K_1,\theta+\theta^{(1)})\right\}^{n-1}$$

where $S^2(Z,\theta)$ is a function of sampling a sample pattern S with an exponential scan as a function of an independent variable quantity Z and an independently varying angular quantity $\theta$, and where $R_a^{(2)}(Z+K_1, \theta+\theta^{(1)})$ is an exponential scan of a reference pattern $R_a$ with a concomitant angular scan $\theta$ and where $K_1$ represents an independent variable providing a linear shift for purposes of cross-correlation with the sample function $S^{(2)}(Z,\theta)$ and where $\theta^{(1)}$ represents an independent variable providing an angular shift for cross-correlation with the sample function $S^{(2)}(Z,\theta)$ where $K_1$ and $\theta^{(1)}$ are varied by preselected numerical increments, means for normalizing the output signal of said power means with a signal representative of $$C_1 \frac{1}{\left(\sum_{K_1}\sum_{\theta^{(1)}}\left\{\sum_{Z}\sum_{\theta} R_a^{(2)}(Z,\theta) R_a^{(2)}(Z+K_1,\theta+\theta^{(1)})\right\}^{n-1}\right)^{1/2}}$$

where $C_1$ is a constant.

8. Apparatus for recognizing a pattern comprising:

first means for receiving data representing said pattern, means for determining the center of gravity of the pattern based upon the output of said first means to produce data representing a centered pattern, means for effectively selectively sampling by annularly scanning said centered pattern centered at a predetermined point with radii spaced exponentially for producing scanning data, means for cross-correlating said scanned data with a plurality of known patterns, Nth power means for raising each output value of said means for cross-correlating to the Nth power, where $N=n+1$ and $n$ is an integer greater than one and for summing over a range of shifted values of relative positions of the sample with respect to the reference wherein the functions of the above means are defined by the formula as follows:

$$\sum_{K_1}\left\{\sum_{Z} S^{(1)}(Z) R_a^{(1)}(Z+K_1)\right\}^{n-1}$$

where $S^{(1)}(Z)$ is a function of sampling a sample pattern S with an exponential scan as a function of an independent variable quantity Z in which several numerical values of Z are selected as desired to sample the pattern, and where $R_a^{(1)}(Z+K_1)$ is a function resulting from an exponential scan of a reference $R_a$ which is adapted to be shifted linearly by an independent variable $K_1$ which is varied by numerical increments for the purpose of cross-correlation as values of $K_1$ are substituted into the expression and preselected and means for normalizing the output signal of said power means with a signal representative of $$C_1 \frac{1}{\left(\sum_{K_1}\left\{\sum_{Z} R_a^{(1)}(Z) R_a^{(1)}(Z+K_1)\right\}^{n-1}\right)^{1/2}}$$

where $C_1$ is a constant.